United States Patent [19]

Mansfield

[11] Patent Number: 4,824,017

[45] Date of Patent: Apr. 25, 1989

[54] EXTERNAL MIX SPRAYING SYSTEM

[75] Inventor: Gregory A. Mansfield, Indianapolis, Ind.

[73] Assignee: Glas-Craft, Inc., Indianapolis, Ind.

[21] Appl. No.: 80,475

[22] Filed: Jul. 31, 1987

Related U.S. Application Data

[63] Continuation-in-part of Ser. No. 885,006, Jul. 14, 1986, abandoned.

[51] Int. Cl.[4] .................................... B05B 7/08

[52] U.S. Cl. .................................... 239/9; 239/294; 239/296; 239/299; 239/306; 239/416.1; 239/419.3; 239/422; 239/424.5; 239/427; 239/433; 239/599; 239/600

[58] Field of Search .................................... 239/8-10, 239/290, 294, 296, 299, 306, 414, 414, 416.1, 416.3, 416.4, 417.5, 422, 424, 424.5, 427, 429, 430, 433, 599, 600, 419.3

[56] References Cited

U.S. PATENT DOCUMENTS

| | | | |
|---|---|---|---|
| D. 252,097 | 6/1979 | Probst et al. | D23/17 |
| 2,780,496 | 2/1957 | Asbeck et al. . | |
| 2,864,653 | 12/1958 | Liedberg et al. . | |
| 3,033,472 | 5/1962 | Shelton | 239/408 |
| 3,202,363 | 8/1965 | Kautz et al. | 239/413 |
| 3,330,484 | 7/1967 | Johnson et al. | 239/414 |
| 3,399,834 | 9/1968 | Bradley | 239/10 |
| 3,521,824 | 7/1970 | Wilcox | 239/424.5 |
| 3,542,296 | 11/1970 | Bradley | 239/306 |
| 3,589,621 | 6/1971 | Bradley | 239/526 |
| 3,635,400 | 1/1972 | Nord et al. | 239/15 |
| 3,759,450 | 9/1973 | Fram et al. | 239/427 |
| 3,763,876 | 10/1973 | Freeman et al. | 137/114 |
| 3,788,555 | 1/1974 | Harrison et al. | 239/336 |
| 3,799,403 | 3/1974 | Probst et al. | 222/135 |
| 3,843,052 | 10/1974 | Cowan | 239/3 |
| 3,893,621 | 7/1975 | Johnson | 239/9 |
| 4,123,007 | 10/1978 | Gardner | 239/414 |
| 4,386,739 | 6/1983 | Kwok | 239/296 |
| 4,527,507 | 7/1985 | Sawai et al. | 239/299 X |
| 4,618,098 | 10/1986 | Hedger, Jr. et al. | 239/290 |
| 4,713,257 | 12/1987 | Luttermöller | 239/8 X |

FOREIGN PATENT DOCUMENTS

| | | |
|---|---|---|
| 3505618 | 8/1986 | Fed. Rep. of Germany . |
| 57-90762 | 6/1982 | Japan . |
| 735983 | 8/1955 | United Kingdom . |

OTHER PUBLICATIONS

Glas-Craft, Inc., LPA Low Pressure Airless Product Sheet.

Glas-Craft, Inc., ISD Spray Up System Product Sheet.

*Primary Examiner*—Andres Kashnikow
*Attorney, Agent, or Firm*—Willian Brinks Olds Hofer Gilson & Lione

[57] ABSTRACT

An external mix, air-assisted, airless atomization, plural component spraying system and method includes a first source of a first component, e.g., a resin; a second source of a second component, e.g., catalyst for the resin; spraying means to mix the resin and catalyst and direct the mixture to a substrate; a source of compressed air; and means for injecting the catalyst into the compressed air. The spraying means includes a nozzle assembly which comprises a liquid nozzle for forming the resin into a fan-like film with expanding edges extending from a liquid orifice, and a nozzle assembly for directing a flow of compressed air and catalyst at the fan-like film colsely adjacent the liquid orifice. In a preferred embodiment, compressed air is directed to impinge upon the expanding edges of the fan-like resin stream downstream of the impingement of the flow of compressed air and catalyst particles to capture from catalyst particles in small, uniform spray pattern. The flow of compressed air and catalyst can be juxtaposed to and interact with the fan-like resin film to assist in atomization of the resin and to mix the catalyst and resin particles in a more uniform spray pattern.

22 Claims, 9 Drawing Sheets

EXTERNAL MIX SPRAYING SYSTEM

This is a continuation-in-part of U.S. patent application Ser. No. 885,006 filed July 14, 1986 (now abandoned).

BACKGROUND OF THE INVENTION

The present invention relates generally to multi-component spraying systems and, more particularly, to an external mix, air-assisted, airless-atomization, plural component spraying system and method.

Multi-component spraying systems are used in manufacturing plastic articles by applying resinous materials to a mold or preform for an article. In such systems, a liquid resin and a catalyst for the resin are formed into spray particles directed to a substrate where the catalyst and resin react and harden to form the article. In such applications, the resin and catalyst components are preferably mixed together; and the mixture is sprayed onto the substrate. For example, in manufacturing articles with polyester resin, a catalyzing agent for the polyester resin is mixed with the resin; and the resin-catalyst mixture is applied to the substrate. In internal mix systems, the resin and catalyst are mixed within the spraying apparatus; and the mixture is atomized by a spray nozzle and directed onto the substrate. In external mix systems, the resin and catalyst are mixed externally of the apparatus after the resin and catalyst have been atomized. In both external mix and internal mix systems, complete and thorough mixing of the resin and catalyst is important to avoid non-uniform hardening of the resin on the substrate and other undesirable results.

In many spraying systems, large quantities of pressurized air are used to atomize the liquid components. Such systems are expensive to operate and have a number of operational inadequacies. It is expensive to compress air, and the large quantities of compressed air used by existing systems impose a significant operating cost on the system. In addition, the blast of compressed air used to atomize the liquid components carries a significant quantity of spray particles away from the substrate, wastes the expensive resin and catalyst, creates an unclean spray area and sometimes requires overspray collection systems, and contributes to the problem of operating such manufacturing operations safely. Furthermore, the use of large quantities of air during operation of the system can often create an undesirable spread of fumes.

In order to overcome some of the inadequacies attending the use of pressurized air to atomize components dispensed from a spraying apparatus, spraying systems have been developed which incorporate airless atomization techniques.

In prior airless atomization devices, an airless spray nozzle has been used to atomize liquid materials which are pumped at high pressure, that is, pressures generally exceeding 500–600 p.s.i. and more frequently in excess of 800 p.s.i., typical operating pressure being 1000–1500 p.s.i. The most commonly used airless nozzle includes an internal, hemispherical passage termination which is cut through by an external, V-shaped groove to form an elongated, elliptical-like orifice. Liquid material pumped at high pressures through such a spray nozzle is forced by the hemispherical termination of the passageway to converge in its flow at and through the elongated orifice. Because of the converging flow at the orifice, the liquid material is expelled through the orifice into a planar, expanding, fan-like film which breaks into spray particles which are carried by their momentum to the article target.

With viscous fluids, such as the resins used in plural component spraying systems to manufacture plastic articles, high pressures of 1000 to 1500 p.s.i. are required. Such high operating pressures impose a strain on system components reducing their reliability, require generally expensive components in the fluid delivery systems, and contribute to the problem of operating such systems safely. Even at high pressures, however, such fan-like films, because they are formed by the convergence of the fluid, include heavy streams at the edges of the planar, fan-like film which are referred to as "tails". Because of the heavy streamlike flow in the "tails", the spray pattern formed by these edge portions of the expanding, fan-like film includes a disproportionate quantity of resin and produces a non-uniform deposit with stripes when the spray pattern is swept across a substrate by a spray gun operator. The non-uniform deposit and resulting stripes make the bending of deposited material into a film of uniform thickness virtually impossible.

Past efforts to solve the problem of the "tails" attending the use of airless spray nozzles have included the insertion of a "preorifice" immediately behind the elongated, elliptical-shaped orifice to concentrate a greater portion of the flow in the central portion of the fan. Although preorifices are helpful, they are not completely satisfactory, adding another source of clogging to the spray gun and another variable factor to be integrated into system operation.

Compressed air has also been used to solve the problem of tails created by airless spray nozzles. See, for example, U.S. Pat. Nos. 3,202,363; 3,521,824; 3,635,400; 3,843,052; and 4,386,739 and Japanese patent publication No. 57-90762. In plural component spraying systems, compressed air has been used to assist in the atomization of plural component materials as shown, for example, in U.S. Pat. Nos. 2,780,496; 2,864,653; 3,799,403; and 4,618,098 and British patent specification No. 735,983.

External mix plural component systems originally included a plurality of separated spray gun or spray nozzles that were directed to blend their patterns together and to mix thereby resins and their catalysts or hardening agents. See, for example, U.S. Pat. Nos. 3,033,472; 3,399,834; 3,542,296; and 3,788,555. More recently, external mix plural component systems have included the plural spray nozzles in a combined nozzle assembly. See, for example, U.S. Pat. Nos. Des. 252,097; 3,893,621; 4,123,007; and 4,618,098.

In prior art external mix, plural component spraying systems using airless resin nozzles, catalyst has been injected into the resin spray formed from an airless spray nozzle at distances on the order of one inch or more in front of the airless spray nozzle. This downstream location for insertion of the resin spray provided mixing of the catalyst spray particles with resin spray particles which had already been formed from the liquid resin at this location. In such prior plural component systems, resin spray particles are formed within a fraction of an inch of the airless spray nozzle, either under the influence of high hydraulic resin pressures, typically on the order of 1,000 psi, or the combined action of lower hydraulic resin pressures and a plurality of compressed air jets located adjacent the airless resin nozzle and directed at the expanding fan-like resin film. Introduction of the catalyst to the spray an inch or more downstream of the liquid orifice was also necessary to avoid the collection of catalyst on the resin nozzle. In prior external mix spraying systems, catalyst spray particles introduced closely adjacent the spray nozzle frequently accumulated on the resin nozzle. An accumulation of catalyst on the resin nozzle will combine with resin at the resin nozzle orifice and cure the resin, blocking the resin nozzle orifice and, requiring removal of the resin nozzle for cleaning or replacement.

In such prior external mix systems, a substantial flow of air accompanied the rapidly moving resin particles at the downstream location of catalyst injection; and this substantial flow of air was transverse to the direction of the catalyst spray being injected into the spray pattern and made it difficult to inject catalyst particles uniformly into the resin spray. In such prior external mix systems, the catalyst particles were injected into a flow of compressed air by the associated apparatus to blow them into and mix them with the resin spray particles. The flows of air accompanying the formation of the resin particles and used to blow the catalyst particles into the resin spray produced uncontrolled billowing air movements which prevented the fine catalyst particles from being incorporated into the spray pattern and being mixed with the resin particles and deposited on the substrate. More importantly, the air flows associated with such prior external mix systems led to the escape of fine catalyst particles into the surrounding environment, thus presenting cleaning problems and requiring air removal systems.

Furthermore, in such prior external mix systems, it was difficult to obtain desirable spray patterns. The use of the plurality of compressed air jets to assist in atomization of the expanding resin film directly adjacent the liquid orifice of the airless nozzle, where the film had substantial integrity, resulted in a deflection of a portion of this compressed air and contributed to the uncontrolled billowing. This was especially true in systems in which the compressed air jets were directed against airless nozzle itself. The focus of the compressed air jets to assist the atomization of the resin film at the airless resin nozzle made it difficult to effectively use the compressed air from the jets to form resin and catalyst particles into a desirable spray pattern. Furthermore, because of the direction and force required of the compressed air to carry the catalyst particles into the resin spray and to achieve effective mixing of the catalyst particles with resin particles, the compressed air used to entrain the catalyst particles could not be effectively used to provide a satisfactory spray pattern.

SUMMARY OF THE INVENTION

The invention rests on the discovery of method and apparatus that includes a flow of compressed air and entrained catalyst particles directed at the expanding, fan-like, resin film closely adjacent the airless nozzle, that effectively mixes catalyst particles with resin particles formed from an airless resin nozzle, and that provides a small, compact spray pattern with uniformly distributed and mixed resin and catalyst that may be easily used by an operator to deposit a uniform film of plural component material on a substrate. In this invention, finely atomized spray particles are not a specific desideratum, not being necessarily required in the manufacture of articles from plural component spraying systems. To the contrary, such articles are generally provided with smooth surfaces by the substrates, molds, or preforms upon which the plural component materials are deposited and cured; and it is desirable that the spray particles remain large enough so that their surface areas are small compared to their masses and they retain their fluidity so they may flow out on a substrate, mold, or preform upon deposition. This retention of fluidity also enhances the ability of the catalyst spray particles to mix with and cure the resin particles upon deposition. The invention provides an external mix, plural component spraying system which is less expensive to manufacture, operate, and maintain and which provides a more effective spray operation, permitting a reduction of liquid pressure and a more effective use of compressed air.

In one embodiment of the invention, a low-volume flow of compressed air and entrained catalyst particles are imposed upon resin projected from an airless nozzle at lower than normal fluid pressures to effectively atomize the resin and, particularly, the resin tails, into small, uniformly sized particles and to effectively and uniformly mix the catalyst with the resin externally of the systems apparatus.

Apparatus of the invention includes a first source of resin, a second source of catalyst for the resin, spraying means to mix the catalyst with the resin and to direct mixed catalyst and resin at an article forming substrate, liquid delivery means to provide a flow of resin from the first source to the spraying means, air delivery means to provide a flow of compressed air to the spraying means and injection means to introduce catalyst particles in the air delivery means. The spraying means comprises a liquid nozzle for forming the resin into a fan-like resin film with expanding edges extending from a liquid orifice, and a nozzle assembly directing a flow of compressed air and catalyst particles at the fan-like resin film. The liquid nozzle and nozzle assembly are adapted so that the flow of compressed air and catalyst particles interact with the fan-like resin film and its expanding edges to provide a spray pattern with mixed and uniformly distributed catalyst and resin particles.

In one preferred embodiment, the airless liquid nozzle is of generally conventional design in that it includes an internal passageway terminating at an internal hemispherical surface which is cut through by an external, V-shaped groove to form an elongated, elliptical-shaped, liquid orifice. The nozzle assembly is positioned around and adjacent to the liquid nozzle and comprises an annular chamber terminated at its forward end by an internal, generally hemispherical-shaped surface which is also cut through by an external, V-shaped groove to form an elongated, elliptical-shaped, air-catalyst orifice. The design and location of the air-catalyst orifice forms a flow of compressed air and catalyst particles which is generally juxtaposed around the fan-like film of resin at the liquid orifice and which includes a greater mass flow of compressed air and catalyst at the edges of the fan-like film at which the "tails" exist. The flow compressed air and catalyst will, therefore, provide preferential assistance in the atomization of the resin "tails" and the mixing of catalyst and resin to provide a spray in which the resin particles are of more uniform size and in which the catalyst carried by the compressed air flow will be more uniformly mixed with the resin particles throughout the volume of the spray.

In another and preferred embodiment of the invention, a flow of compressed air and entrained catalyst particles is directed at the planar surfaces of the expanding resin film from the opposite sides thereof to impinge upon the expanding resin film a fraction of an inch forwardly of the liquid orifice and a pair of compressed air flows is directed forwardly and generally parallel to each other and to the spray axis to impinge upon the expanding sides of the resin film forwardly of the impingement of the compressed air and catalyst particles on the expanding resin film. Surprisingly, when compressed air is directed at the expanding edges of the fan-shaped resin film downstream of the impingement of the catalyst particles and the entraining compressed air upon the expanding resin film, the uncontrolled billowing flow of air and escaping catalyst particles is eliminated and a striking reduction in spray pattern size and improvement of the spray pattern uniformity results without the creation of the finely atomized resin particles characterized by prior air-assist, airless resin atomizing systems. The coaction of the flows of compressed air, catalyst particles and resin particles results in the capture of the fine catalyst particles within the spray pattern and the thorough and uniform mixing of catalyst and resin particles with a spray pattern having an almost rectangular cross-section with a relatively small ratio of length to width.

The invention further permits more complete and effective atomization of the liquid resin and more uniform mixing of catalyst and resin particles at liquid pressures and air volumes substantially lower than those commonly used in the prior art. Systems incorporated into the present invention, for example, may effectively operate with liquid pressures as low as 300-500 p.s.i.

Further advantages and specific details of the invention will be set forth hereafter in conjunction with the detailed description of the preferred embodiment.

BRIEF DESCRIPTIONS OF THE DRAWINGS

FIG. 1 schematically illustrates an external mix, air-assisted, airless atomization, plural component spraying system according to one preferred embodiment of the invention;

Figure 11:
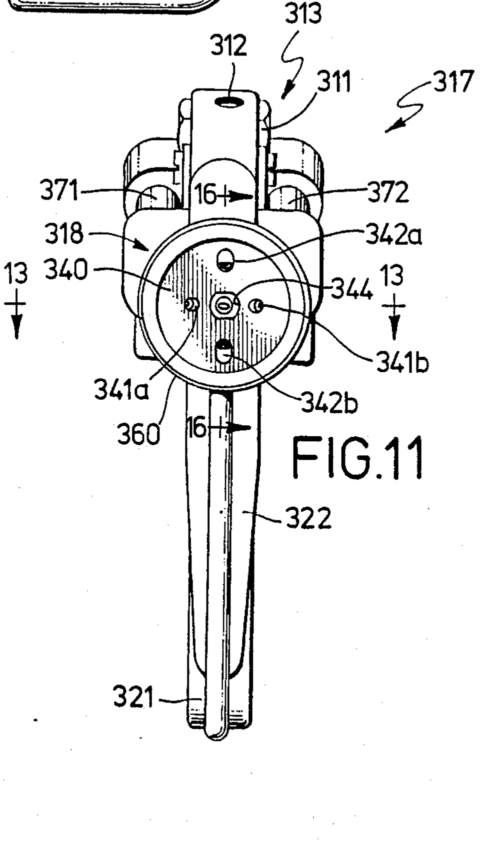
FIG. 11 is a front view of the embodiment of FIG. 10 without the catalyst injector.
Figure 13:
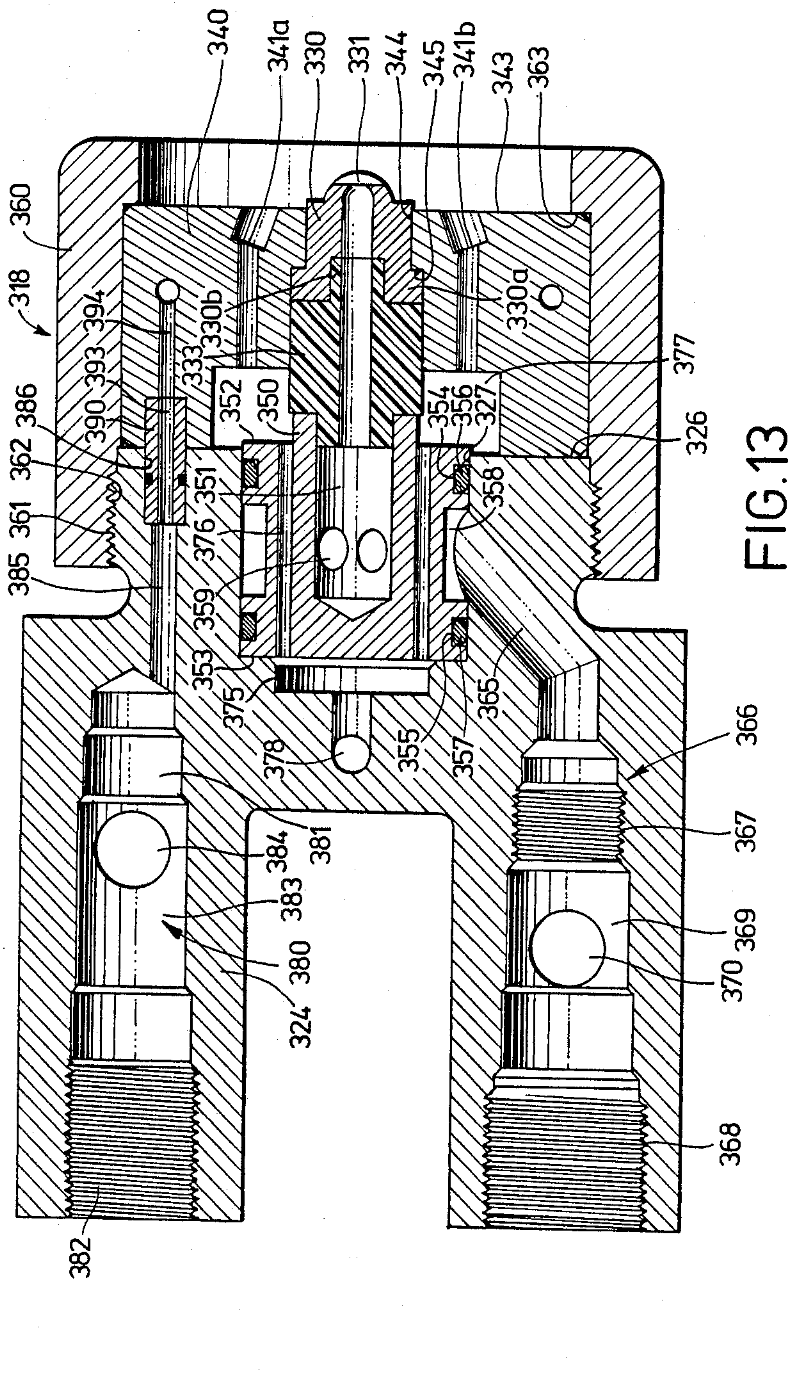
FIG. 13 is a cross-sectional view of the head portion of the embodiment of FIGS. 10-12 taken at section 13—13 of FIGS. 10 and 11.
Figure 17:
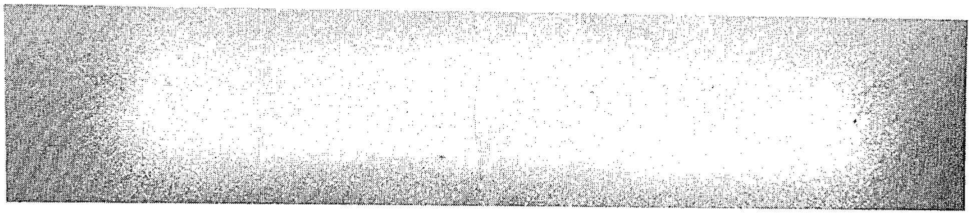
Figure 16:
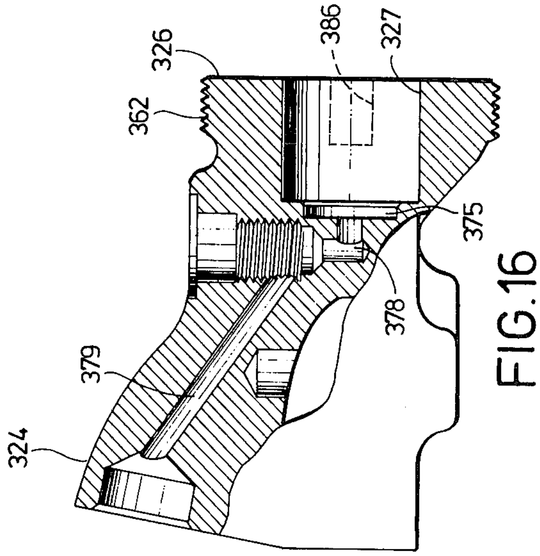
Figure 15B:
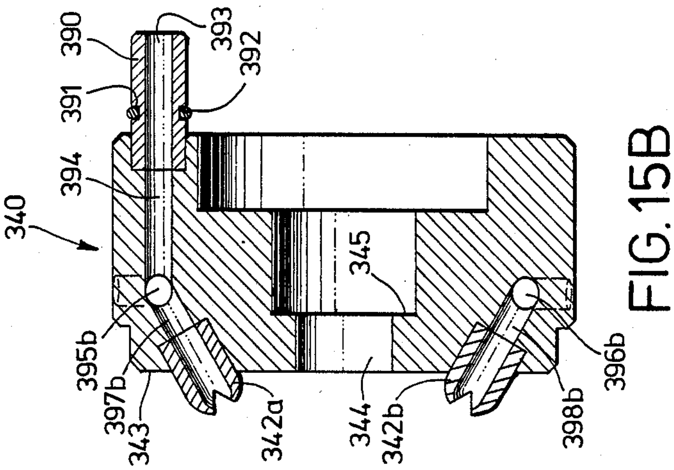
Figure 15C:
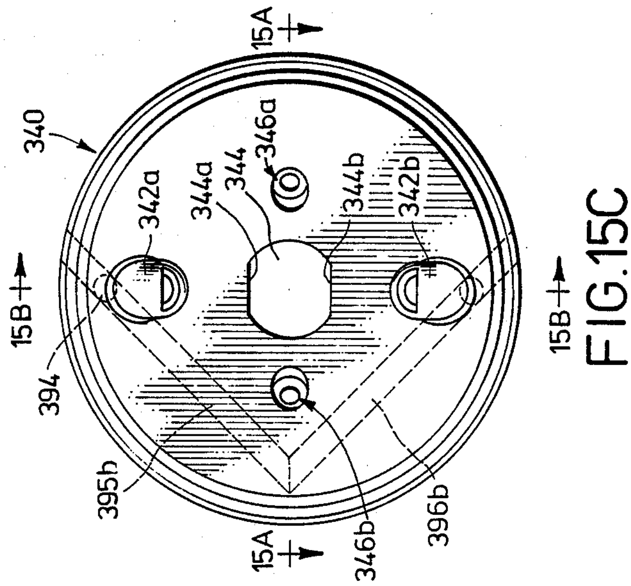
Figure 15A:
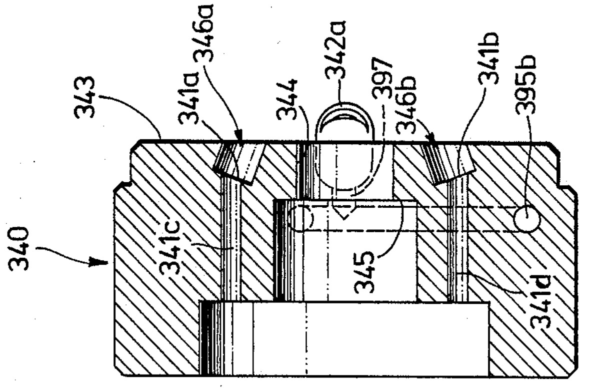

FIGS. 15A-C are a front view and two orthogonal cross-sectional views of the nozzle assembly for gel coat applications;

FIG. 16 is a partial cross-sectional view of the head portion of of FIG. 13 (without the spray nozzle assembly) taken on a plane lying at right angles to the plane of the cross section of FIG. 13, as indicated in FIG. 11, to illustrate the air passageways; and FIG. 17 is an illustration of a static spray pattern obtained with a preferred embodiment of this invention.

DETAILED DESCRIPTION OF THE PREFERRED EMBODIMENT

Figure 1:
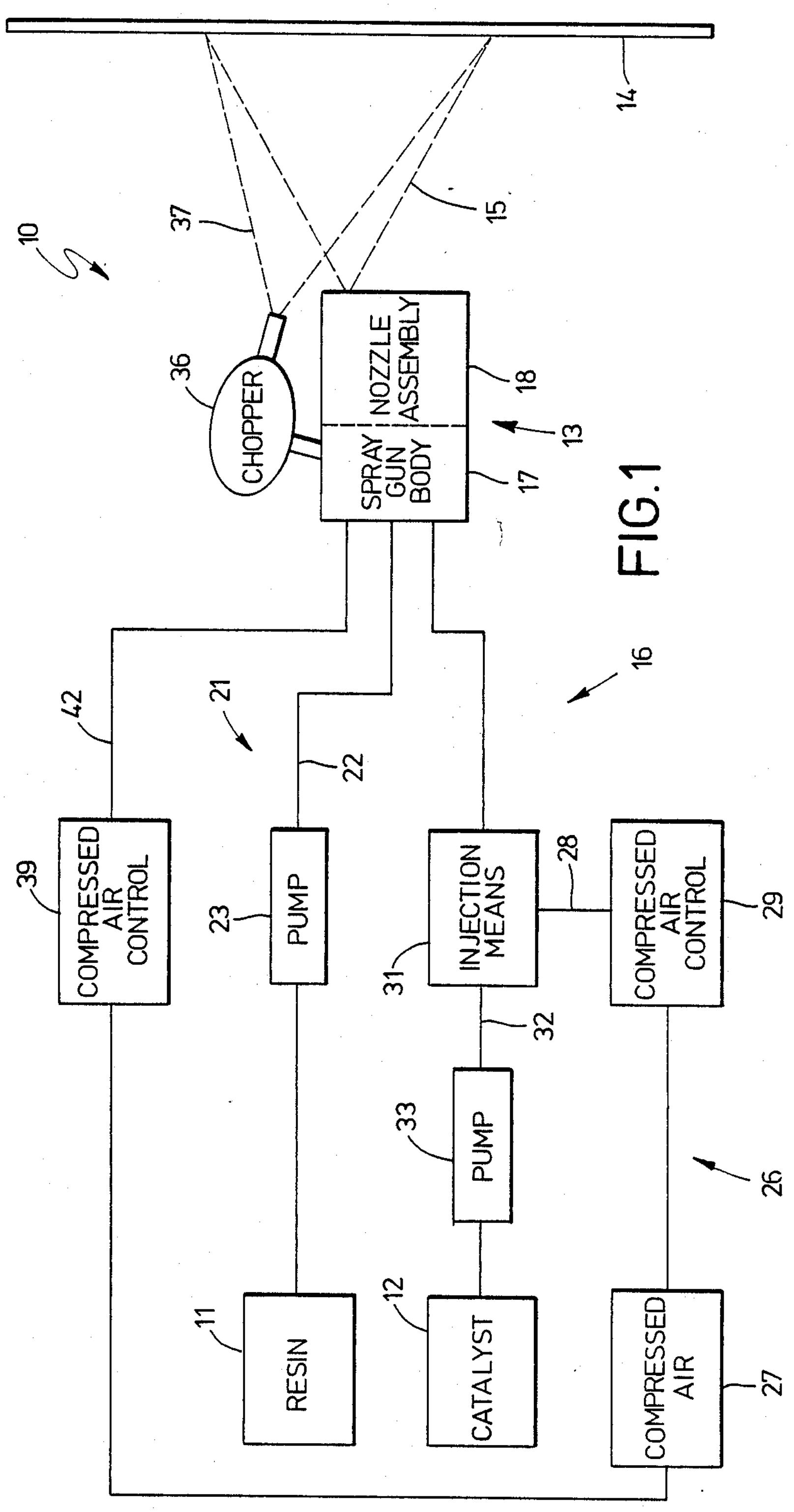

FIG. 1 schematically illustrates an external mix, air-assisted, airless atomization, plural component spraying system of the invention. The system is generally designated by reference numeral 10 and includes a first source 11 of a first component, e.g., a resinous material; a second source 12 of a second component, e.g., a catalyst for the resinous material; spraying means 13 for mixing the catalyst and resin and for directing the mixture at a substrate 14; and delivery means 16 for delivering the resin, catalyst, and other materials to the spraying means during operation of the system.

Spraying means 13 preferably comprises a hand-held spray gun which includes a spray gun body 17 with a nozzle assembly 18 at its front. Nozzle assembly 18, which is described in detail below, comprises an air-assisted, airless atomization nozzle assembly in which compressed air and liquid pressure are combined in the spraying of the resinous material. Thus, system 10 includes a compressed air source 27; and delivery means 16 includes air delivery means 26 for delivering compressed air to the spraying means 13. In addition, a flow of resin from source 11 is delivered under pressure to spraying means 13 via liquid delivery means 21, which includes conduit 22 and pump 23.

Catalyst from source 12 is delivered to spraying means 13 by introduction into the compressed air from source 27 that assists in atomization of the resin. Specifically, system 10 includes catalyst injection means 31, which receives catalyst under pressure from source 12 via conduit 32 and pump 33, and compressed air from source 27 via compressed air control 29 and conduit 28. Catalyst injection means 31 introduces the catalyst into the compressed air as a spray for delivery to the spraying means 13.

As described below, the flow of resin into spraying means 13 is directed through an airless liquid nozzle in nozzle assembly 18 which forms the resin flow into a fan-like film. The flow of catalyst-injected compressed air into spraying means 13 is directed through an air nozzle assembly 18 configured and positioned so that the compressed air will coact with the fan-like resin film externally of the spraying means, assist in atomization of the resin and, particularly, the tails of the fan-like film, and simultaneously mix the resin and catalyst particles.

The resin-catalyst mixture from spraying means 13 is directed at substrate 14 as an expanding fan-like spray schematically illustrated at 15 and in operation swept over substrate 14. Substrate 14 comprises an article-forming substrate such as a mold or preform used to manufacture articles from the catalyzed resin applied thereto. The resin can comprise any one of numerous materials such as a polyester or epoxy resin, and the catalyst comprises a material suitable for catalyzing the resin.

System 10 may include a chopper 36 mounted to spraying means 13 to dispense strands of fiberglass or the like into the spray pattern 15, as indicated at 37, to reinforce the plastic article and to act as a filler. System 10 includes a second compressed air control 39 connected to spraying means 13 by conduit 42. Compressed air from source 27 through control 39 drives an air motor in chopper 36 and can be used to remove any resin residue from the spraying means following a spraying operation.

Figures 2, 3:
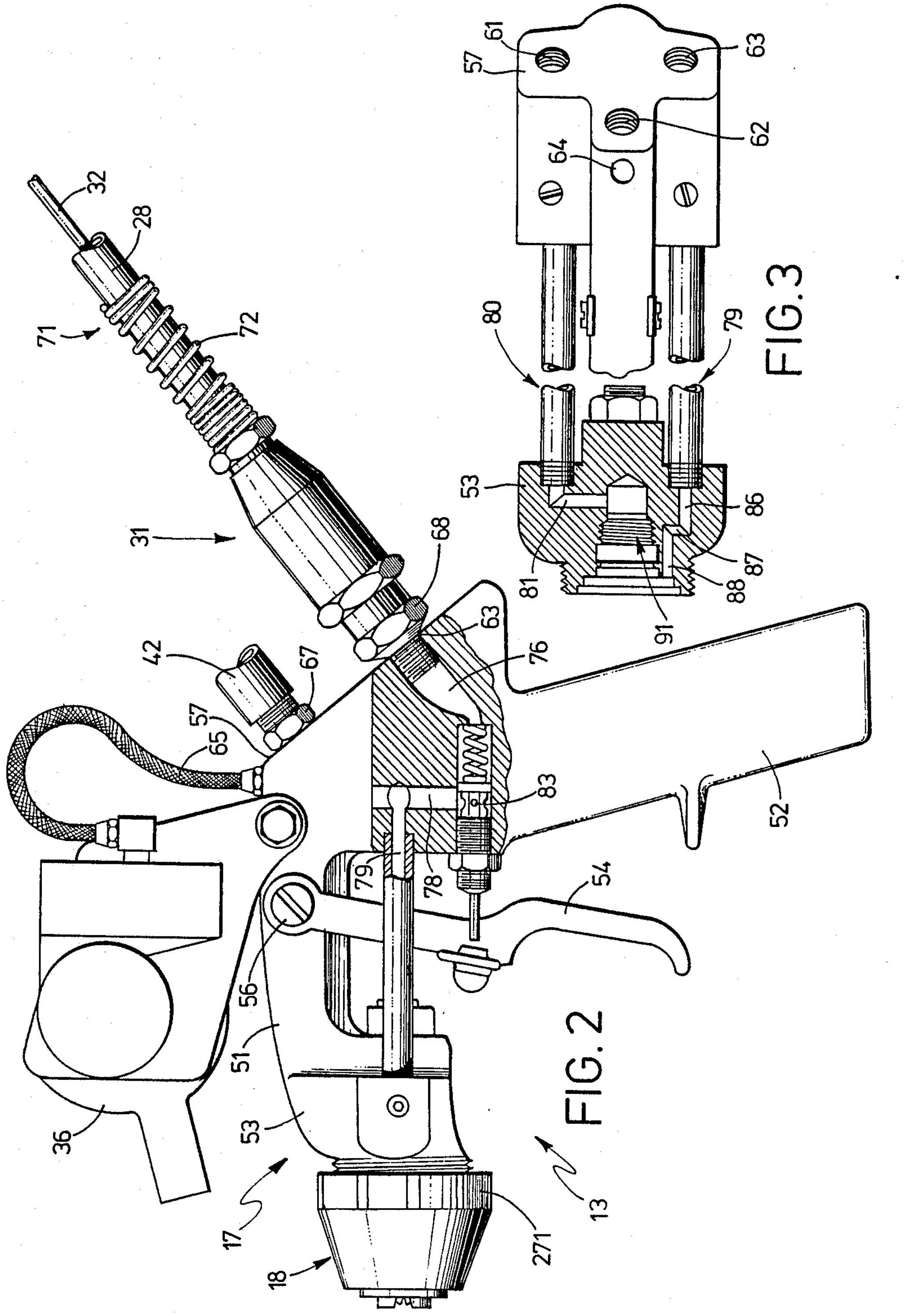
FIG. 2 is a partial cross-sectional view of a spray gun body and catalyst injection means of FIG. 1.
FIG. 3 is a top view of the spray gun body of FIG. 2 partially in section.

FIG. 2 illustrates spraying means 13 and catalyst injection means 31 in greater detail. As shown, spraying means 13 comprises a hand-held spray gun including a spray gun body 17 having a nozzle assembly 18 affixed to the front end thereof. As shown in FIG. 2, gun body 17 includes a body portion 51, a handle portion 52, and a head portion 53. A trigger 54 is movably attached to body portion 51 by an axle or pin 56.

The rear face of body portion 51 of spray gun body 17 defines a mounting platform 57 having a plurality of openings 61, 62, and 63 therein (see FIG. 3). Openings 61–63 comprise inputs to a plurality of passageways within the spray gun body through which the catalyst, resin, and compressed air are caused to flow during operation of the spray gun. As shown in FIG. 2, catalyst injection means 31 is adapted to be connected to opening 63 so that compressed air from source 27 (FIG. 1) will be combined with catalyst from source 12 and introduced into and caused to flow through spray gun body 17. Opening 61 is adapted to be connected to resin source 11 via conduit 22, and opening 62 is connected to compressed air source 39 via line 42 to power the motor in chopper 36. The various conduits are connected to the gun body by appropriate hose couplings such as illustrated at 67 and 68 in FIG. 2. As shown in FIG. 2, platform 57 is preferably angled at about 30°–60° from the horizontal to conveniently connect the gun to hoses or other conduits carried by overhead booms or over an operator's shoulder.

Catalyst injection means 31 can comprise the fluid valve and mixing assembly described and shown in U.S. Pat. No. 3,763,876 of Freeman et al., the disclosure of which is incorporated herein by reference. As described in the Freeman et al. patent, the mixing device 31 is connected to compressed air source 27 and catalyst source 12 by a hose 71 having inner and outer concentric conduits 32 and 28, respectively. Spring 72 is positioned around hose 71 to provide for controlled flexing of the hose and to protect the outer conduit 28. While FIGS. 2 and 4 show the catalyst injection means 31 as a separate unit, the operative portions of the catalyst-injection means may be housed within the gun body.

As shown in FIGS. 2 and 3, compressed air and catalyst flowing into spray gun body 17 through opening 63 from catalyst injection means 31 flow through passageway 76, a valve assembly 83, and passageways 78 and 79 in gun body portion 51 and through passageways 86, 87, and 88 in the head portion 53 (see FIGS. 5 and 6) and into the nozzle assembly 18. Resin flows into the spray gun body through opening 61 and flows through similar passageways and a valve assembly including passageway 80 in gun body 17 and through passageway 81 in head portion 53 (see FIGS. 5 and 6) into nozzle assembly 18. Operation of valve assembly 83 and the valve assembly in the resin line and, hence, control of the flow of resin and catalyst-injected compressed air through the spray gun, is achieved by depressing and releasing the trigger 54.

To provide the capability of operating a chopper, the body portion 51 is provided with a passageway leading from opening 62 to a valve cavity, such as that in which valve assembly 83 is located, in the central plane of body portion 51 adjacent the trigger 54 and from the valve cavity to opening 64 (FIG. 3). Where a chopper is used, compressed air from source 27 is connected with opening 62; and its flow is controlled by a third valve assembly (not shown) which is installed in the control valve cavity and operated by squeezing trigger 54. The compressed air to drive the pneumatic chopper motor of chopper 36 is thus controlled by trigger 54 and directed to opening 64 which is connected to the chopper drive motor by a flexible conduit 65 as indicated in FIG. 2.

Figure 4:
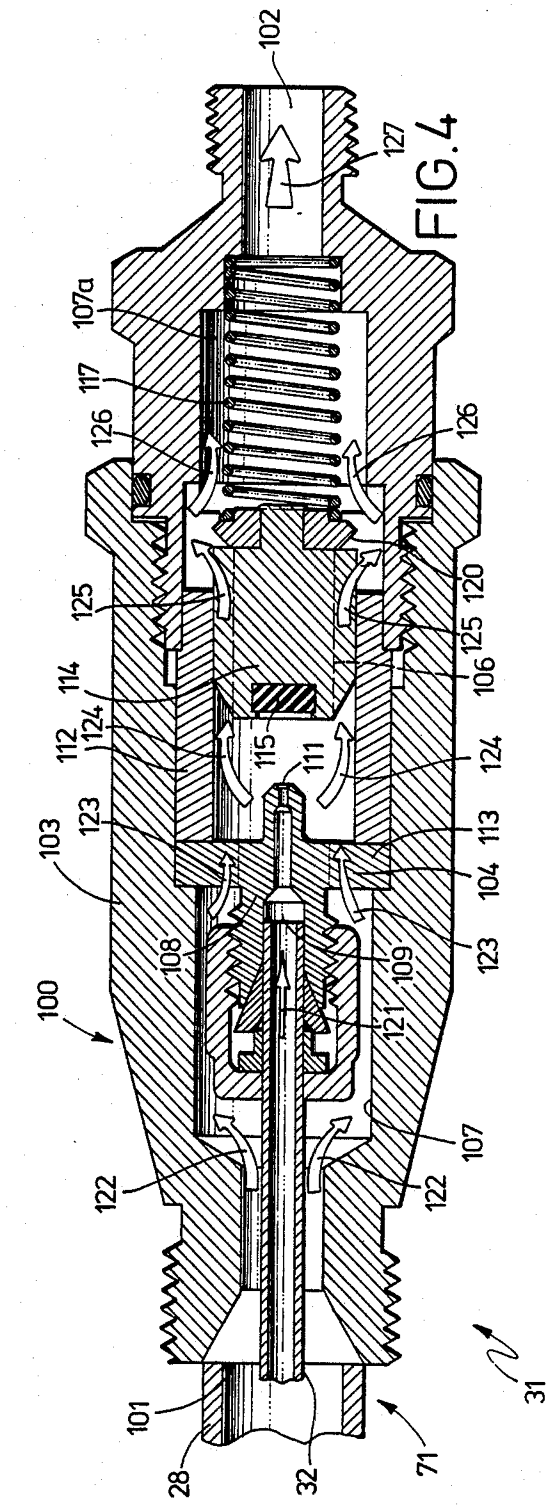
FIG. 4 is a cross-sectional view of the catalyst injection means of FIGS. 1 and 2.

FIG. 4 illustrates the catalyst injection means 31 in greater detail. As indicated previously, catalyst injection means 31 may be identical to the fluid valve and mixing assembly described in U.S. Pat. No. 3,763,876 or may be incorporated into the gun body and is only briefly described herein. Catalyst injection means 31 comprises a fluid valve and mixing assembly 100 having an input end 101 connected to hose assembly 71, and an output end 102 adapted to be connected to opening 63 in spray gun body 17 (FIG. 2). Inner conduit 32 of hose assembly 71 connects the valve and mixing assembly 100 with catalyst source 12, and outer conduit 28 is connected with compressed air source 27.

Fluid valve and mixing assembly 100 comprises a housing 103 having an internal, cylindrical chamber 107 extending from input end 101 to output end 102. A fluid nozzle 108 is supported within chamber 107 and includes an internal passageway 109, the input of which is coupled to inner catalyst conduit 32. Passageway 109 tapers down to a fluid outlet orifice 111 from which catalyst is ejected during operation of the assembly 100. Nozzle 108 includes a web portion 113 having a plurality of webs extending outwardly therefrom and defining a plurality of peripheral openings 104 therethrough. A cylindrical sleeve 112 retains the web portion 113 and the nozzle body in position within housing 103.

A piston 114 is positioned within sleeve 112 and is movable lengthwise therein. The periphery of piston 114 is configured to define passageways 106 between the inner surface of sleeve 112 and the outer surface of piston 114. The end face of piston 114 retains a sealing member 115 which is adapted to close orifice 111 of the nozzle member 108. Piston 114 is normally biased towards the nozzle by spring 117 such that the sealing member 115 will normally abut against and seal orifice 111 when no fluids are flowing through the valve and mixing assembly 100. When piston 114 is biased to the left in FIG. 4, with sealing means 115 closing orifice 111, passageways 106 in piston 114 are closed by circular end portion 120 of piston 114 which forms a seal with the inner surface of sleeve 112.

In operation, catalyst is supplied under pressure to the inner conduit 32; and pressurized air is supplied to outer conduit 28. Catalyst enters into the inner passageway 109 of nozzle 108, as indicated by arrow 121, but is prevented from exiting through the orifice 111 as a result of piston 114 being biased against orifice 111 by spring 117. Pressurized air from conduit 28 is contained within chamber 107, around the body of fluid nozzle 108, in the passageways 104 in webbed portion 113, and in passageways 106 between the piston 114 and sleeve 112; and its pressure acts upon circular end portion 120 of piston 114.

The compressed air acting upon the end portion 120 of piston 114 will not, however, move piston 114 as long as the valve assembly 83 in gun body 51 is closed. When trigger 54 is pulled, however, opening the valve assembly 83, chamber 107*a* is opened to atmospheric pressure. The pressurized air, acting on the circular end portion 120 of piston 114, causes the piston to move to the right, as shown in FIG. 4, in the direction of fluid flow.

When piston 114 moves to the right, to the position shown in FIG. 4, orifice 111 is uncovered, allowing catalyst to exit through the orifice into the interior of annular sleeve 112. In the position shown in FIG. 4, passageways 106 in the piston are unblocked, allowing the compressed air to flow therethrough into chamber portion 107*a*, as indicated by arrows 122, 123, 124, and 126, and as indicated by arrow 127, through output 102 into gun body 51 and through its passageways to nozzle assembly 18. The catalyst will also flow outwardly around piston 114 and thoroughly mix with the pressurized air prior to the mixture flowing into the spray gun body.

When the trigger 54 is released, the flow of pressurized air is terminated; the energy stored in spring 117 will be released; and the piston 114 will be driven to the left to again block orifice 111 to terminate flow of catalyst through the orifice. Thus, fluid valve and mixing assembly 100 provides a convenient, reliable, and effective means for injecting catalyst into the compressed air used to assist in atomization of the resin flowing through spraying means 13.

FIGS. 5–9 illustrate the air-assisted, airless nozzle assembly 18 incorporated into spraying means 13 of the system of the invention. Nozzle assembly 18 is shown in assembled form in FIG. 5 affixed to the head portion 53 of spray gun body 17, and in exploded form in FIG. 6. Basically, nozzle assembly 18 comprises a liquid nozzle 201 for forming a resin flow into a fan-like film with expanding edges extending from a liquid orifice, and an air nozzle 231 for forming a flow of catalyst injected compressed air into a fan-like flow extending from an air orifice. The air nozzle 231 and the liquid nozzle 201 are positioned and oriented relative to one another so that the expansion and fan-like flow of catalyst-injected compressed air will interact with the fan-like resin film and its expanding edges to assist in atomization of the resin film and to uniformly mix the catalyst and the resin particles.

Figure 5:
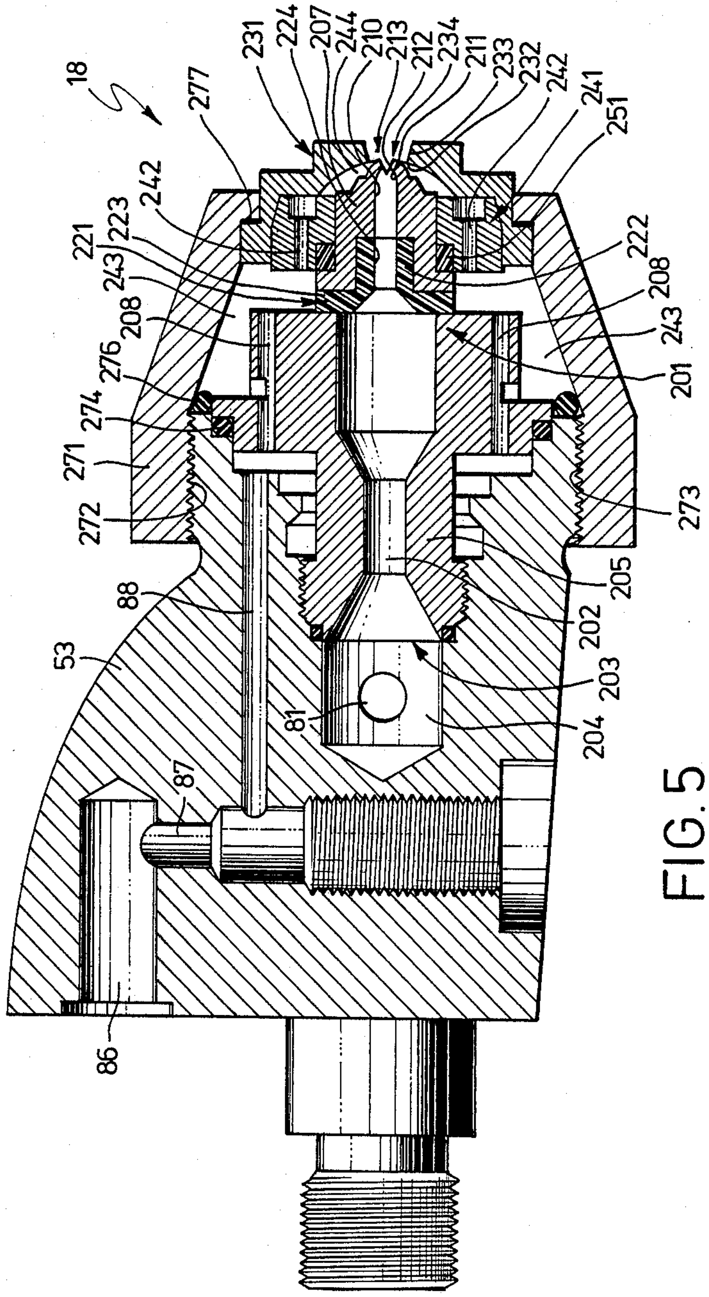
FIG. 5 is a cross-sectional view illustrating the nozzle assembly of FIG. 2 that is affixed to the head of the spray gun body.
Figure 6:
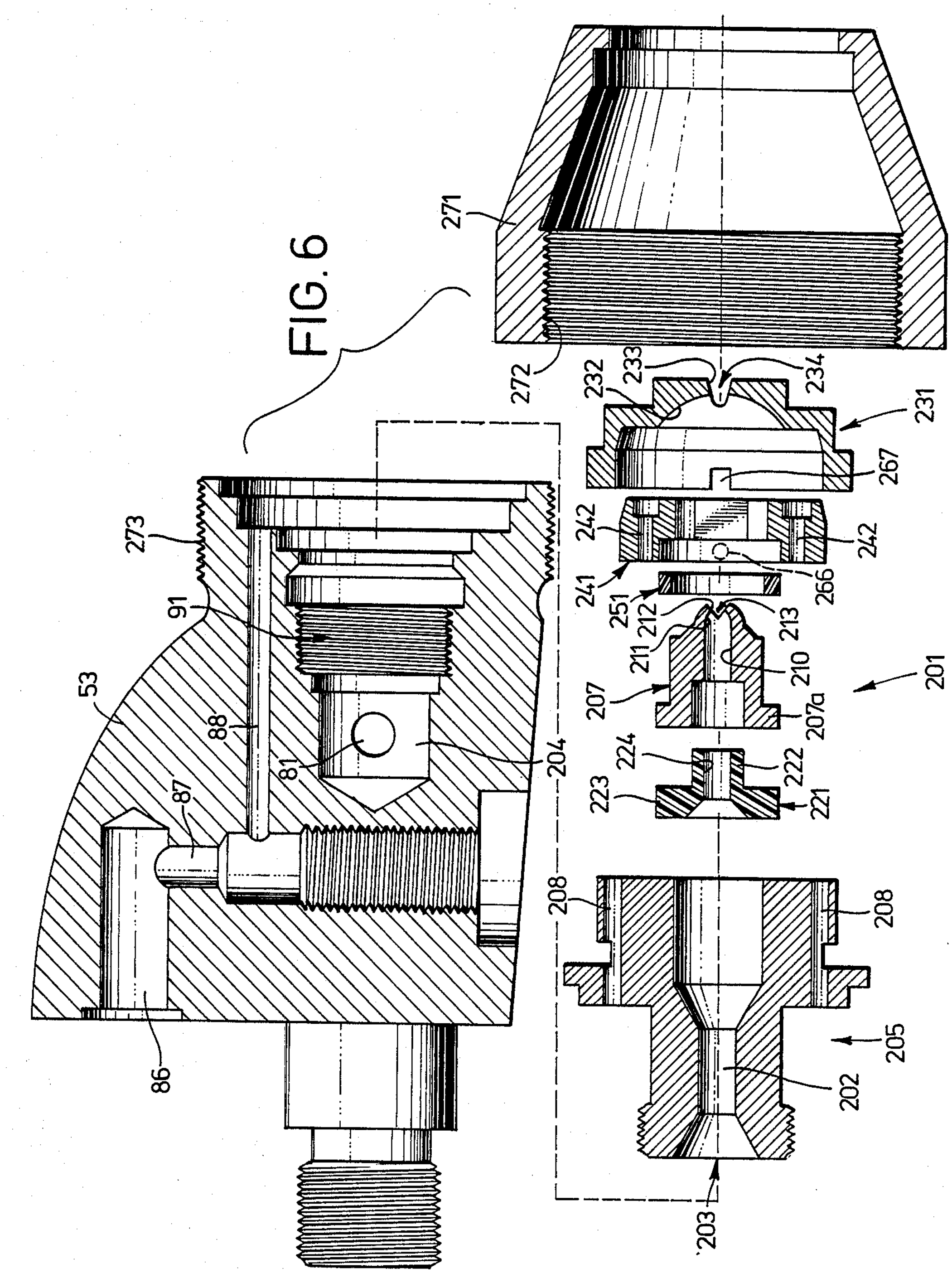
FIG. 6 is an exploded view of the nozzle assembly of FIG. 5.

With reference to FIGS. 5 and 6, liquid nozzle 201 comprises a body portion 205 and a separate liquid spray tip portion 207. Body portion 205 comprises a generally cylindrical-shaped member of aluminum or the like having a central passageway 202 extending longitudinally therethrough. When nozzle assembly 18 is mounted to spray gun body 17 in the cavity 91 provided therein, passageway 202 communicates with passageway 81 in head portion 53 in the spray gun body (see FIG. 3) via chamber 204 to receive a flow of liquid resin through input end 203 thereof. Body portion 205 of nozzle 201 also includes a plurality of relatively narrow, longitudinal passageways 208 (e.g., four passageways) around the periphery thereof. Passageways 208 are adapted to receive a flow of catalyst-injected compressed air from passageways 86, 87, and 88 in head portion 53 of gun body 17, as will be described more fully hereinafter.

Figure 7:
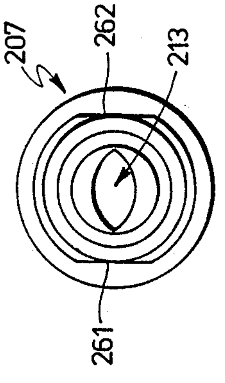
FIG. 7 is a front end view of the liquid nozzle spray tip of FIGS. 5 and 6.

Spray tip 207, also shown in FIG. 7, is mounted on the end of body portion 205 and includes an internal, central passageway 210 aligned with passageway 202 in body portion 205. Passageway 210 terminates at an internal, generally hemispherical surface 211 which is cut through by an external, V-shaped groove 212 to define an elongated, elliptical-like, liquid orifice 213. Spray tip 207 may be constructed of tungsten carbide or another suitable material.

As is known in the spraying art, liquid nozzle 201 comprises an airless spray nozzle for atomizing the liquid resin. Liquid resin flowing through spray tip 207 is forced by the hemispherical termination of the passageway 210 to converge in its flow at and through the elongated orifice 213. Because of the converging flow at the orifice 213, the liquid material is expelled through the orifice into an expanding fan-like film which breaks into spray particles which are carried by their momentum to the substrate 14 (FIG. 1) or other target.

Nozzle assembly 18 further includes a nozzle seal 221 positioned between body portion 205 and spray tip 207 to prevent leakage therebetween. Nozzle seal 221 comprises an annular sealing member having a portion 222 which extends into the interal passageway 210 of spray tip 207, and an annular shoulder portion 223 that is positioned between the body and the spray tip to seal therebetween. Nozzle seal 221 has an internal passageway 224 that is aligned with the passageway 210 in the spray tip when the seal is inserted into the spray tip. Nozzle seal 221 is sized to fit rather snugly within spray tip 207 but is removable for replacement whenever necessary.

Figure 9:
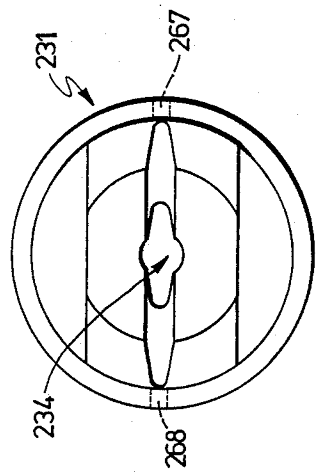
FIG. 9 is a front end view of the air-catalyst nozzle of FIGS. 5 and 6.

As described previously, the fan-like resin film formed by liquid spray tip 207 typically includes heavy streams at its expanding edges which are referred to as "tails"; and the resin in such "tails" frequently forms resin particles which are unacceptably large. Air nozzle 231 provides a flow of catalyst-injected compressed air which assists in atomization of the fanlike resin film into particles of a smaller, more uniform size, while simultaneously mixing catalyst with the resin externally of the apparatus. Air nozzle 231, which is also shown in FIG. 9, comprises a dome-shaped member having a generally hemispherical, internal surface 232 which is cut through by an external, V-shaped groove 233 to form an elongated, somewhat elliptical, air orifice 234. Air nozzle 231 is positioned with respect to liquid sray tip 207 so that air orifice 234 is aligned with liquid orifice 213.

Air nozzle 231 is supported in position relative to spray tip 207 by spray tip holder 241 (see also FIG. 8) which functions to both space the air nozzle from the liquid nozzle and to maintain the two nozzles properly aligned with respect to one another. A spacer ring 251 is positioned around the spray tip 207 and rests upon the annular shoulder portion 207*a* of spray tip 207. Spacer ring 251 cooperates with spray tip holder 241, as shown in FIG. 5, to help position the air nozzle longitudinally with respect to the liquid nozzle. Spray tip holder 241 includes a plurality of passageways 242 extending therethrough for the passage of catalyst-injected compressed air from annular chamber 243 into dome-shaped chamber 244 beneath dome-shaped surface 232.

Upon operation of the trigger 54 of the spray gun body 17, catalyst-injected compressed air flows through passageways in gun body 17, including passageways 86, 87, and 88 in head portion 53 of gun body 17, and flows through passageways 208 in body portion 205 into annular chamber 243; and resin flows through the passageways in the gun body 17, including passageways 81 and 204 in the head portion 53 of gun body 17, and through passageways 202 and 210 into airless spray tip 207.

From annular chamber 243, the catalyst-injected, compressed air flows through passageways 242 in spray tip holder 241 into the chamber 244 beneath hemispherical surface 232 in the air nozzle. The flow of catalyst-injected compressed air is forced to converge at the elongated orifice 234 and, it is believed, expands outwardly in a fan-like flow with a concentrated mass flow at its edges. The expanding flow of compressed air is juxtaposed around the fan-shaped liquid film formed by the liquidnozzle and provides a greater mass flow of compressed air juxtaposed to the expanding edges of the fan-like resin film to provide a concentration of the atomizing effect of the compressed air in the area of the "tails" formed by the liquid nozzle, thus providing preferential assistance to atomize the "tails" of the film to reduce the size of resin particles in the area of the tails and to provide a spray of substantially uniform sized particles.

The flow of the compressible air fluid is substantially like the flow of the incompressible resin fluid in the sense that both are urged to converge at elongated orifices which are generally coaxial and generally coplanar along their central axes. Because, however, the liquid nozzle and the compressed air nozzle share a common axis, the flow of air directed at and acted upon by the generally hemispherical surface at the inside of the air nozzle is generally annular in cross section prior to its interaction with the hemispherical internal surface of the air nozzle.

Because the catalyst is generally uniformly entrained in the flowing compressed air, a greater concentration of catalyst will be formed adjacent the tails of resin spray; and as the compressed air and the liquid film interact, the catalyst injected into the compressed air will be mixed with the resin in a substantially uniform manner.

The various components forming nozzle assembly 18 are assembled by concentrically nesting one part upon or within another. Specifically, to assemble nozzle assembly 18, body portion 205 is positioned in the opening 91 provided in the head portion 53 of spray gun body 17. Spray tip 207 having nozzle seal 221 inserted therein and spacer ring 251 positioned therearound is then placed on nozzle body 205. Spray tip holder 214 is then positioned over the spray tip 207.

As shown in FIG. 7, spray tip 207 includes a pair of opposed flat external surfaces 261 and 262 extending lengthwise thereon. As in FIG. 8, spray tip holder 241 includes a pair of opposed, flat, internal surfaces 263 and 264. To insert spray tip holder 241 over spray tip 207, surfaces 263 and 264 must be aligned with surfaces 261 and 262, respectively. Accordingly, surfaces 261–264 function as first alignment means to automatically angularly orient the spray tip holder with respect to the spray tip.

Figure 8:
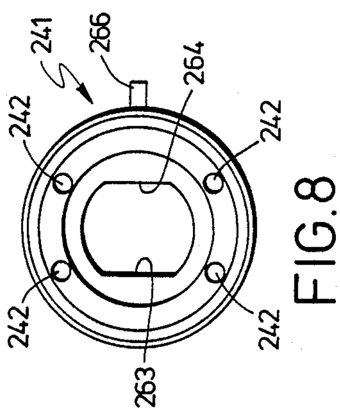
FIG. 8 is a front end view of the spray tip holder of FIGS. 5 and 6.

As also shown in FIG. 8, spray tip holder 241 includes a small peg 266 extending outwardly therefrom. Peg 266 is adapted to be received within one of a pair of diametrically opposed slots 267 and 268 formed in the side of air nozzle 231 as shown in FIGS. 6, 8, and 9 when air nozzle 231 is inserted over spray tip holder 241. Thus, peg 266 and slots 267 and 268 function as second alignment means to automatically angularly orient the air nozzle with respect to the spray tip holder so that the long dimensions of their orifices run in the same direction.

The first and second alignment means thus ensure that the liquid orifice 213 in spray tip 207 will be in proper alignment with the air orifice 234 in air nozzle 231 for proper operation of the nozzle assembly whenever the nozzle components are assembled together.

Following mounting of the air nozzle, an external retaining ring 271 is positioned over the assembled components to hold the components together and to mount the nozzle assembly to the spray gun body. Retaining ring 271 preferably includes a threaded portion 272 to engage a threaded surface 273 on the head portion 53 of the spray gun body to firmly hold the nozzle assembly on the spray gun body while permitting easy removal therefrom for servicing or replacement. O-ring seals are preferably provided at 274, 276, and 277 to prevent leakage between the retaining ring and other components of the apparatus.

The nozzle assembly of the present invention can be easily disassembled for servicing whenever necessary, and then quickly reassembled for use. The invention, in particular, permits rapid replacement of the liquid nozzle spray tip 207 without replacing the entire liquid nozzle. Ease in replacement of spray tip 207 is an important capability because liquid orifice 213 tends to clog because of its small size and frequently needs replacement. The separate spray tip 207 also permits the spray tip to be used withr nozzle bodies of different configuration for different applications. The present invention thus reduces equipment downtime and the cost of replacement and inventory of parts.

In assembling the nozzle structure, the first and second alignment means provides proper, automatic alignment of the liquid and air orifices to ensure proper operation of the spray gun. The basic method of air-assisted, airless atomization of the invention permits less critically in the location of air and liquid nozzles and thus greatly simplifies the assembly procedure.

FIGS. 10–16 illustrate a particularly preferred embodiment of an external mix, plural component spraying system of this invention.

Figure 10:
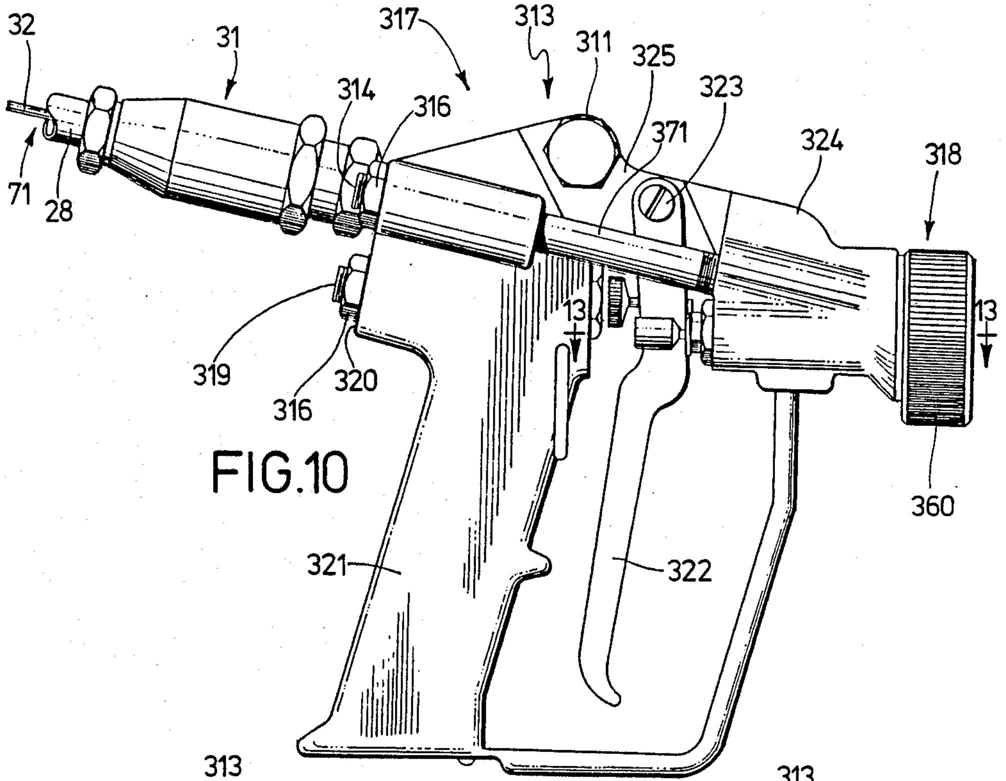
FIG. 10 is a side view of another preferred embodiment of this invention.
Figure 12:
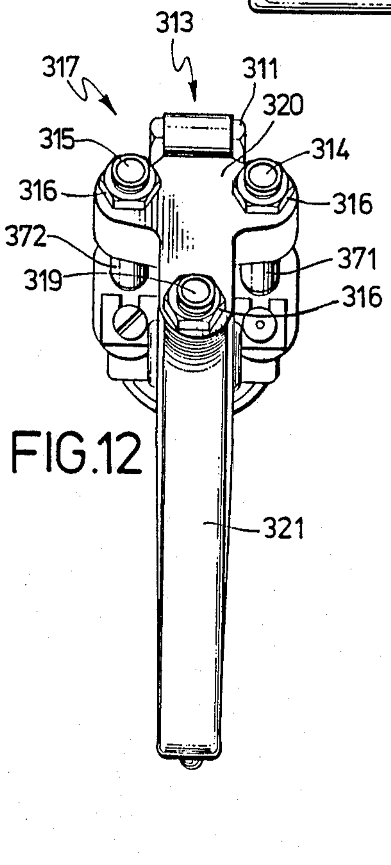
FIG. 12 is a rear view of the embodiment of FIG. 10 without the catalyst injector.

FIGS. 10–12 illustrate the preferred embodiment of a hand-held, spraying means 313. The hand-held spraying means 313 preferably comprises a spray gun body 317 with a nozzle assembly 318 at its front. Spray gun body 317 and nozzle assembly 318 are described in substantially more detail below.

The embodiment of FIGS. 10–14 show the preferred embodiment with the nozzle assembly 318 adapted for use with a chopper, that is, its spray pattern is oriented horizontally. Spraying means 313 may be fitted with a chopper, in the same manner as spraying means 13 of FIG. 2 is fitted with chopper 36, by attaching it to spray gun body 317 by means of a bolt fastener 311 at the top of spray gun body 317. When a chopper is used in conjunction with spraying means 313, a flexible air hose connects opening 312 at the top of spray gun body 317 to the chopper. When a chopper is not used with spraying means 313, hole 312 is plugged with a threaded closure.

In use, spraying means 313 of FIGS. 10–12 is connected into the system shown in FIG. 1 in place of spraying means 13. The first source of the first component, i.e., the resinous material, is connected to the opening 314 at the rear of spray gun body 317. The resinous material from source 11 may then be provided by pump 23 through hose 22 to opening 314 at the rear of spray gun body 317. The second source 12 of the second component, i.e., the catalyst for the resinous material, is connected through pump 33, hose 32, and injection means 31 to opening 315 at the rear of spray gun body 317 (see FIG. 12). As shown in FIG. 10, injection means 31 may be conveniently attached to spray gun body 317 by threading it into opening 315 or onto a fitting 316 that is threaded into opening 315. Compressed air from compressed air source 27 is connected through a compressed air control 39 and a hose 42 to opening 319 at the rear of spray gun body 317. The upper rear portion of spray gun body 317 is provided with a mounting platform 320 into which openings 314, 315, and 316 are perpendicularly drilled. When connected into system 10 of this invention, the connections for resin, catalyst, and compressed air can be, thus, conveniently carried over the hand of the operator as he grips handle 321 formed in spray gun body 317.

Operation of the spraying system is effected by pulling the trigger means 322 which is pivotally fastened to spray gun body 317 by means of a threaded fastener 323. As the operator pulls trigger 322 rearwardly toward handle 321 of spray gun body 317, trigger 322 operates an air valve (not shown) located in the central plane of the spray gun body 317 rearwardly of trigger 322 and in a passageway leading from opening 319 to the interface between the forward position 325 of spray gun body 317 and head portion 324 (see FIG. 16 which illustrates the air passageways in the head portion 324). The trigger also operates a pair of valves for the resin and for the air-entrained catalyst located forwardly of the trigger in cavities 366 and 380 in the head portion 324 attached at the forward portion 325 of spraying means 317 (see FIG. 13).

In the operation of spraying means 313, catalyst from source 11 (FIG. 1) is delivered to spraying means 313 by its introduction into a second flow of compressed air from source 27. As indicated above and shown in FIG. 10, a catalyst-injection means 31 may be carried at the rear of spray gun body 317; the operative components of the catalyst injection means are, however, preferably incoporated into the spray gun body 317. Catalyst-injection means 31 receives catalyst from source 12 as a result of the operation of a pump 33, through a conduit 32, and a controlled flow of compressed air from source 27 and compressed air control 29 through conduit 28. Catalyst-injection means 31 introduces the catalyst into the compressed air for delivery to opening 315 at the rear of spray gun body 317. Cstalyst-injection means 31 is illustrated in FIG. 4 and its operation is described in detail above.

In operation, spraying means 313 provides an expanding flow of mixed resin and catalyst which may be directed by the system operator onto a substrate 14, which may be a mold or preform used to manufacture articles of varied shape. Spraying means 313 may be used without a chopper 36 to form a smooth, catalyzed resin film on substrate 14. Such smooth, non-reinforced resin films are frequently referred to as being a "gel coat" and provide a smooth article surface. When spraying means 313 is used to spray "gel coat", the nozzle assembly 318 provides a vertically oriented spray pattern. FIGS. 15A–15C illustrate a nozzle assembly for spraying "gel coat" with the spraying means 313. If further strength is required in the manufactured article, spraying means 313 may be operated with a chopper, as described above, to introduce, into the catalyst-resin spray, reinforcing fibers of selected length into a layer of catalyzed resin desposited over the "gel coat" on the substrate. These fibers are preferably chopped fiberglass as described above.

FIGS. 13–16 illustrate the head end 324 of the gun and the spray nozzle assembly 318 attached to head end of the gun.

FIG. 13 is a cross-sectional view of the head end of 324 of the spraying means 313 with nozzle assembly 318 attached. The cross-sectional view of FIG. 13 is viewed upwardly on a plane through the center line of nozzle assembly 318 as indicated on FIGS. 10 and 11. Nozzle assembly 318 includes an airless liquid resin nozzle 330 and an air-catalyst nozzle 340. Liquid nozzle 330 forms the resin flow into a fan-like film with expanding edges extending from a liquid orifice 331 formed in nozzle 330. Air-catalyst nozzle 340 forms a controlled flow of air through a plurality of air orifices 341*a*, 341*b* and a controlled flow of catalyst entrained in air from a plurality of catalyst nozzles 342*a* and 342*b* (see FIGS. 13 and 14B). Nozzle assembly 318, including liquid nozzle 330 and air-catalyst nozzle 340, forms a resin-catalyst mixture having a spray pattern (see FIG. 17) which is almost rectangular in its cross section with a uniform distribution of spray throughout the pattern along its longitudinal axis and without escaping catalyst particles. The spray pattern is substantially smaller than the spray patterns obtained with prior systems and may be conveniently used by an operator of spraying means 313 to provide a uniform, catalyzed, resin film on a substrate, mold, or preform.

FIG. 13 shows how nozzle assembly 318 is assembled onto head portion 324 of spray gun body 317. As shown in FIG. 13, spray nozzle 330 is held onto head portion 324 of the spray gun body by air-catalyst nozzle 340 and a threaded retainer nut 360. Retainer nut 360 includes a threaded portion 361 at its rear which threads onto a threaded portion 362 at the forward end of head portion 324. As its forward portion, retainer nut 360 forms an inwardly projecting flange 363 which engages the front face 343 of air-catalyst nozzle 340, urging it rearwardly and tightly against the front face 326 of head portion 324 of the spray gun body. Air-catalyst nozzle 340 is formed with a central opening 344 which is shaped to include two, flat surfaces 344*a* and 344*b* (see FIGS. 11 and 15C). Opening 344 fits around liquid nozzle 330. A rearwardly facing flange 345 is formed around central opening 344; and as the retaining nut 360 is threaded onto the head portion 324 of the spray gun and its rearwardly facing flange 363 engages the front face 343 of air-catalyst nozzle 340 and urges air-catalyst nozzle 340 rearwardly, flange 345 of air-catalyst nozzle 340 presses liquid nozzle 330 rearwardly into engagement with sealing means 333 and body portion 350. As shown in FIG. 13, sealing means 333 is preferably formed with a forward portion of reduced diameter to fit within an enlarged cavity 330*b* at the rear of liquid nozzle 330. Sealing means 333 also includes a rearward portion of reduced diameter to fit within the body portion 350. Sealing means 333 can thus be sealingly engaged between liquid nozzle 330 and body portion 350. Thus, as retaining nut 360 is threaded onto head portion 324 of the gun body, it simultaneously fastens the air-catalyst nozzle 340 and liquid nozzle 330 to head portion 324 of the gun and provides an effective seal between liquid nozzle 330 and air-catalyst nozzle 340 and, by means of seal means 333, between liquid nozzle 330 and body portion 350.

Body portion 350 comprises a generally cylindrical-shaped component of aluminum or stainless steel having a central passageway 351 extending from its front face longitudinally into, but not through, its body. Body portion 350 also forms a pair of outwardly extending flanges 352 and 353 forming a pair of O-ring grooves 354 and 355 to carry a pair of O-rings 356 and 357 to seal between body portion 350 and the inner wall 327 that forms a central cavity in head portion 324 of the spray gun body. An annular cavity 358 is formed by the flanges 352 and 353 of the body portion between body portion 350 and inner wall 327 or head portion 324. A plurality of openings 359 is formed in body portion 350 extending between cavity 358 and central passageway 351.

When body portion 350 is held in place in the cavity formed in head portion 324 of the spray gun by inner surface 327, the annular cavity 358 that it forms communicates with a passageway 365 formed in head portion 324. Passageway 365 extends rearwardly in head portion 324 and intersects a machined cavity 366 formed in the rear of head portion 324 and adapted to accept the elements of a resin valve (not shown). Cavity 366 thus includes a threaded portion 367 adapted to accept a valve seat having a threaded exterior. Valve cavity 366 further includes at the rear face of head portion 324 a threaded portion 368 adapted to accept the washers, packing elements, and threaded compression nut necessary to provide (as known in the art) a compression packing and to seal around a needle valve actuator that extends longitudinally from trigger 322 along the center line of cavity 366 into engagement with a valve seat threaded into portion 367. With the valve seat positioned in threaded portion 367 and packing members in position in threaded portion 368, cavity 366 forms a central fluid cavity 369 which is in communication with a passageway 370 in head portion 324. Passageway 370 leads through a tube 371 (shown in in FIGS. 10, 11, and 12) to opening 314 (shown in FIGS. 10 and 12).

Thus, with pump 23 (FIG. 1) operating, pressurized resin is presented at opening 314 into passageway 370 through the tube 371. As long as trigger 322 is not being operated, the valve seat adjacent threaded portion 367 of cavity 366 in the head portion of the gun body is closed; and there will be no resin flow through the spray gun body. When trigger 322 is pulled rearwardly, removing the needle valve from the valve seat at threaded portion 367, resin flows under the influence of pressure imparted by pump 23 through passageway 370, cavity 369, passageway 365, annular cavity 358, openings 359, central passageway 351, liquid nozzle 330 and the opening 331 therein. Liquid nozzle 330 includes interior passageways to force the resin to flow into a fan-like film with expanding edges extending forwardly from liquid orifice 331.

Body portion 350, when in place in the cavity formed in head portion 324 of the spray gun, also forms an air passage to deliver a flow of compressed air to the plurality of air orifices 341*a* and 341*b* in the front of the air-catalyst nozzle 340. As shown in FIG. 13, the central cavity of head portion 324 includes a rearward portion 375 having a smaller diameter than the cavity formed by inner wall 327 of head portion 324. Body portion 350 further includes a plurality of passageways 376, preferably four, extending forwardly from its rear face at the cavity 375 to adjacent its forward end where the plurality of passageways 376 opens into an annular cavity 377 formed between body portion 350, front face 326 of head portion 324 of the spray gun, and air-catalyst nozzle 340. A plurality of air passageways extends from the rear air-catalyst nozzle surface that communicates with annular cavity 377 to orifices 341*a* and 341*b* at the front face 343 of air-catalyst nozzle 340. Compressed air, which is controlled by a needle valve in spray gun body 317 rearwardly of trigger 322, is directed through passageways which are not shown in the spray gun body 317 from opening 319 (FIGS. 10 and 12) to the interface between head portion 324 and the front portion 325 of spray gun body 317. As shown in FIG. 16, passageway 378 intersects a passageway 379 in head portion 324 which extends rearwardly to the interface between head portion 324 and the front portion 325 of spray gun body 317. When trigger 322 is operated, the compressed air flows from source 27 and compressed air control 39 (FIG. 1) through conduit 42, opening 319, the passageways in gun body 317 (not shown), passageway 379, passageway 378, cavity 375, the plurality of passageways 376, annular cavity 377, passageways 341*c* and 341*d* formed in air-catalyst nozzle 340 and from the plurality of air orifices 341*a* and 341*b*.

As shown in FIG. 13, the rear portion of head portion 324 of the spray gun body also forms a cavity 380 adapted to carry means to control the flow of air-entrained catalyst from spraying means 313. Cavity 380 includes a threaded portion 382 adjacent the rear face of head portion 324 adapted to carry a separate, self-contained, needle valve assembly (not shown) with a needle valve actuator that extends from the trigger valve 322 within the self-contained needle valve assembly into engagement with a valve seat carried within the self-contained needle valve assembly. With needle valve assembly in place, cavity 380 forms a central cavity 383 which, as shown in FIG. 13, communiates with passageway 384. Passageway 384 extends upwardly through head portion 34 of the spray gun body and extends rearwardly through tube 372 shown in FIGS. 11 and 12 to opening 315 and catalyst-injection means 31. When trigger 322 is operated, opening the valve carried in cavity 380 of head portion 324 of the spray gun, catalyst particles and air flow under the influence of catalyst pump 33, compressed air source 27, and compressed air control 29, through injection means 31, orifice 315 at the rear of the spray gun body 317, tube 372 (FIGS. 1, 11, and 12), passageway 384, and through passageway 385 to cavity 386 (FIG. 13). With air-catalyst nozzle 340 in the position shown in FIGS. 10–13, the air-entrained catalyst is directed into a passageway 393 in a tube 390 at the rear of the nozzle assembly 340 and into air-catalyst passageway 394 in the air-catalyst nozzle 340.

Figure 14A:
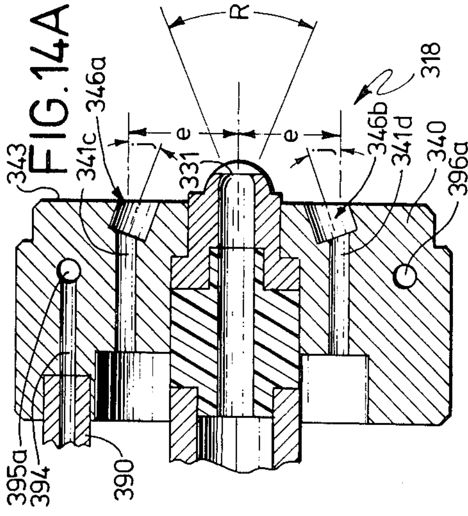
FIGS. 14A and 14B are two orthogonal views of the nozzle assembly of FIGS. 10 and 13.
Figure 14B:
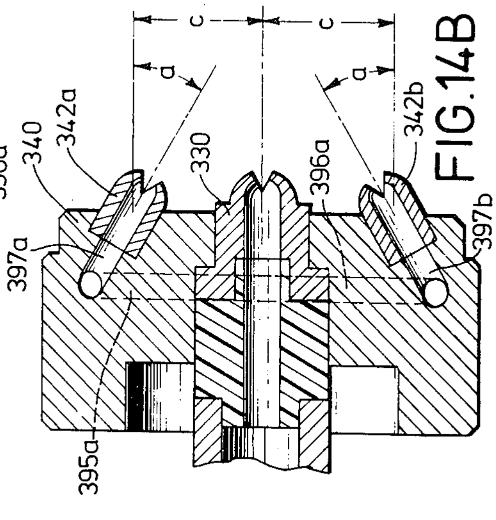

FIGS. 14A–14B and FIGS. 15A–15C illustrate the "chop" and "gel coat" embodiments of nozzle assembly 340, respectively. FIGS. 14A and 14B are orthogonal views of the "chop" nozzle assembly 318 of FIG. 13 taken on planes through the centers of the air orifices 341*a* and 341*b* and air-catalyst nozzles 342*a* and 342*b*, respectively. FIG. 15C is a front view of the nozzle assembly for gel coat applications. FIG. 15A is a cross-sectional view of the nozzle assembly through section 15A—15A of FIG. 15C. FIG. 15B is a cross-sectional view of the air-catalyst nozzle 340 taken along a plane at right angles to the plane of the cross section of FIG. 15A, and in gel coat applications corresponds with the plane of the cross section of FIG. 13. The plane of the cross section of FIG. 15A corresponds with the plane of the cross section of FIG. 16. The nozzle assembly 340 has a diameter of about 1.5 inches.

As shown in FIG. 13, the nozzle assembly 340 includes a tube 390 extending from its rearmost face. The tube 390 forms an O-ring groove 391 and carries an O-ring 392. When the air-catalyst nozzle 340 is assembled to the head portion 324 of the spray gun body as shown in FIGS. 10–13, its tube 390 extends into the cavity 386, and O-ring 392 forms a seal between pipe 390 and the cylindrical surface of head portion 324 forming cavity 386.

Thus, in the "chop" application (FIGS. 13, 14A and 14B) compressed air and catalyst flowing to cavity 386 flow into passageway 393 of pipe 390 and passageways 394, **395*a*, and 396*a* (see (FIG. 14B) drilled into the main body of air-catalyst nozzle 340. Passageways 395*a* and 396*a* intersect within the body of spray nozzle 340 with passageway 394 and are closed at the peripheral surfaces of the body. As shown in FIG. 14B, compressed air and catalyst are directed via passageways 397*a* and 397*b* which intersect passageways 395*a* and 396*a*, respectively, to the plurality of air-catalyst spray nozzles 342*a* and 342*b*. The air-catalyst spray nozzles 342*a* and 342*b* direct the air-entrained catalyst at the expanding, fan-like flow of resin from the liquid nozzle 330 which is positioned in central opening 344, as described below. In the gel coat application (FIGS. 15A–15C), tube 390 is located directly behind one of the air-catalyst nozzles; and passageway 394 is located to intersect passageway 395*b*, as shown in FIG. 15B. With this arrangement, nozzle assembly 340 is positioned so its spray pattern is vertically oriented when nozzle assembly 340 is assembled onto head portion 324 with its tube 390 in cavity 386. The central opening 344 of the nozzle assembly 340 includes two flattened portions 344*a* and 344*b* (see FIGS. 11 and 15C) to ensure that the nozzle assembly 340 is properly aligned with the airless resin nozzle 330. In the gel coat embodiment, compressed air and catalyst flow through passageways 394, 395*b*, and 396*b* to passageways 397*b* and 398*b*, respectively, and to air-catalyst nozzles 342*a* and 342*b*. The air-catalyst nozzles 342*a* and 342*b* may be pressed into the body of nozzle assembly 340** or maybe fastened therein by any conveinent fastening method.

In the illustrated embodiments of FIGS. 14A and 14B, and 15A–15C, the nozzle assembly 340 surrounds airless resin nozzle 330 that preferably forms a fan-like film with an included angle R of 40°–50°; and the airless nozzle is located within the opening 344 at the longitudinal center line of nozzle assembly 340. The air-catalyst spray nozzles **342*a* and 342*b* formed by the nozzle assembly are located on a plane that is perpendicular to and bisects the expanding, fan-like resin film formed by the airless resin nozzle. The air catalyst nozzles are oriented to direct the flow of compressed air and catalyst at an acute, included angle a with respect to the expanding, fan-like resin film and impinge upon the expanding fan-like resin film at a distance of from about five-tenths to about eight-tenths of an inch forwardly of the orifice of the airless nozzle. Such orientation prevents a troublesome accumulation of catalyst particles on the resin nozzle. In the embodiments illustrated in FIGS. 14 and 15**, the air-catalyst spray nozzles can be equally spaced from the center line of the liquid orifice of the airless nozzle by a distance c of about three-eights of an inch to about one-half of an inch and directed to form equal acute included angles a of about 25 to about 35 degrees with respect to a plane containing the expanding fan-like resin film.

A flow of compressed air in the illustrated embodiments of FIGS. 14 and 15 is formed by two passageways **341*c*, 341*d*** parallel to both the longitudinal axis of a nozzle assembly and to each other. The two passageways are equally spaced from the central axis of the airless resin nozzle a distance e of about three-tenths to about four-tenths of an inch and lie in the plane that perpendicularly bisects the plane through the center of the catalyst spray nozzles. Where in one preferred embodiment using a resin nozzle with a nominal included angle R of 40°–50°, the distance c was about 0.0458 inch; the angle a was about 30°; and the distance e was about 0.375 inch.

In addition, as shown in FIGS. 14A and 15A, a pair of cavities **346*a* and 346*b* may be formed in the front face 343 of nozzle assembly 340 around air orifices 341*a* and 341*b*, respectively. Cavities 346*a* and 346*b* are formed in the front face 343 in such a manner that they extend inwardly at an acute angle with respect to air passageways 341*c* and 341*d*, respectively, but in such a manner that there are no air catalyst nozzle surfaces forwardly of the air orifices 341*a* and 341*b* that lie within the imaginary extension of the air passageways 341*c* and 341*d* and compressed air is directed fowardly and generally parallel to the spray axis to impinge upon the expanding sides of the resin film forwardly of the impingement of air-catalyst from spray nozzles 342*a* and 342*b*. Cavities 346*a* nd 346*b* tend to form low-pressure areas adjacent the air orifices 341*a* and 341*b* which "soften" the edges of the compressed air jets projected from orifices 341*a* and 341*b* as the compressed air jets extend forwardly from the front face 343 of the air-catalyst nozzle. The acute angle j formed by the central axis of cavities 346*a* and 346*b* and the longitudinal axis of air passageways 341*c* and 341*d* may vary; with the specific embodiment described above, effective operation can be obtained with cavities 346*a* and 346*b* lying at an angle j equal to about 20 degrees if the cavities have a diameter of about 0.138 inch and a depth of about 0.118 inch; and the diameter of air passageways 341*c* and 341*d*** is about 0.062 inch.

In the absence of the flow of compressed air and entrained catalyst particles which characterizes this invention, the spray pattern of the resin from an airless nozzle 330 includes a central portion having a high ratio of length to width and tapering ends, and two end portions at each edge of the pattern characterized by almost circular cross-sections and a heavy deposition of resin material. The air-entrained catalyst of this embodiment directed at the fan-like resin film from air-catalyst spray nozzles **342*a* and 342*b*, in the absence of the compressed air flows from orifices 341*a* and 341*b*, substantially widens the spray pattern, increasing the ratio of length to width of the central portion without diminishing the concentration of resin deposition at the end portions of the pattern and, further, results in an air billowing which carries fine catalyst particles away from the spray pattern into the surrounding environment. With the flow of compressed air from orifices 341*a* and 341*b* directed at the expanding edges of the fan-shaped resin film downstream of the impingement of the air-entrained catalyst, the uncontrolled billowing of air and escaping catalyst is eliminated and a surprising improvement in the size and uniformity of the spray pattern results as shown in FIG. 17**.

FIGS. 14A and 14B present an illustration of the arrangement of the air-catalyst nozzles and compressed air nozzles of the nozzle assemblies of FIGS. 14 and 15. The liquid nozzle forms the resin into a fan-like film having expanded edges forming an angle R, shown in FIG. 14A; in the preferred embodiments, R equals about 40 to 50 degrees. Air passageways **341*c* and 341*d* lie preferably along axes parallel to each other and perpendicular to the front face 343 of air-catalyst nozzle 340. The central axes of air passageways 341***c* and 341*d* are displaced from the center line of the nozzle assembly 340 and the liquid orifice 33 at such a distance that the center axes of the passageways 341*c* and 341*d* intersect the expanding edges of the liquid film that form the included angle R downstream of the intersection of the air-catalyst spray from air-catalyst spray nozzles 342*a* and 342*b*. Thus, for preferable operation, the distance e (the separation between the center line of air passageways 341*c* and 341*d* from the center line of liquid orifice 331) divided by the tangent of one-halt of the angle R (the included angle formed by the expanding fan-like liquid film) is greater than the distance c (the separation between the center line of the air-catalyst spray nozzle orifices and the center line of the liquid orifice 331) divided by the tangent of a (the acute angle between a line parallel to the central axis of airless nozzle 330 and the center axes of the air-catalyst spray nozzles 342*a* and 342*b*. In mathematical terms:

$$\frac{e}{\tan\frac{R}{2}} > \frac{c}{\tan a}$$

In systems of the invention, the flow of catalyt particles and compressed air are thus directed at the fan-like resin film closely adjacent (i.e., directly at or a fraction of an inch in front of) the airless resin nozzle and a flow of compressed air may be directed at the expanding edges of the fan-like film downstream of the impingement of the air-entrained catalyst particles on the resin film.

Such systems provide substantially improved spray patterns such as that illustrated in FIG. 17. FIG. 17 illustrates a static spray pattern resulting from three to four seconds operation of the spraying system of this invention at a spacing of about eighteen inches from a planar substrate with the resin pump 23 (FIG. 1) providing resin to a 50° airless nozzle at about 440 psi, the compressed air control 39 providing compressed air for the nozzle assembly at about 25 psi and the compressed air control 29 providing compressed air for the catalyst entrainment at about 30 psi. Under these conditions, the spray pattern of FIG. 17 has a uniform distribution of catalyst and resin in a pattern about fourteen inches long and about two inches wide. Under the same operating conditions, the static spray pattern has a length of about eleven inches and a width of about one and one-half inches at a substrate-nozzle spacing of twelve inches and has a length of about seventeen inches and a width of about two and one-fourth inches at a substrate-nozzle spacing of twenty-four inches. Systems of this invention are less expensive to manufacture, operate, and maintain and are easier and safer to use through their improved spray patterns, and permit reductions of resin hydraulic pressure and compressed air pressure and more effective use of compressed air. Such systems can provide improved operation with resin pressures substantially less than 500 psi and with air pressures of about 30 psi and less.

While what has been described constitutes a presently most preferred embodiment, the invention can take many other forms. Accordingly, it should be understood that the invention is to be limited only insofar as is required by the scope of the following claims.

I claim:

1. Means for forming an article from a catalyzed, resinous material, comprising:

a first source of resin;

a second source of catalyst for said resin;

spraying means to mix said catalyst with said resin and to direct mixed catalyst and resin at an article-forming substrate;

liquid delivery means to provide a flow of resin from said first source to said spraying means;

air delivery means to provide a flow of compressed air to said spraying means; and injection means to introduce catalyst in said air delivery means, said spraying means comprising a liquid nozzle for forming the resin flow into a fan-like resin film with expanding edges extending from a liquid orifice, and a nozzle assembly directing compressed air and catalyst particles at the fan-like resin film, said nozzle assembly including an annular chamber terminated at its forward end with a spherical-shaped, internal surface portion and an elongated air-catalyst orifice, said liquid nozzle being located centrally within the annular chamber of said nozzle assembly and including an internal passageway terminating in a hemispherical surface, and said liquid orifice being formed by a V-shaped external groove intercepting the internal hemispherical surface of the liquid nozzle to form the elongated liquid orifice, said compressed air and catalyst particles being directed through said elongated air-catalyst orifice to assist the formation and mixing of catalyst and resin spray particles uniformly throughout the spray pattern by a greater mass flow of compressed air and catalyst particles juxtaposed to the expanding edges of the fan-like film of resin, said liquid nozzle and said nozzle assembly being adapted to that the compressed air and catalyst particles interact with the fan-like resin film and its expanding edges to provide a spray pattern with mixed catalyst and resin particles substantially uniformly distributed throughout the spray pattern.

2. The means of claim 1 wherein said injection means comprises a fluid valve and mixing assembly coupled to said second source of catalyst and to said air delivery means for introducing catalyst into said compressed air, and wherein said air delivery means includes means for coupling said fluid valve and mixing assembly to said spraying means to provide a flow of compressed air and catalyst particles to said spraying means.

3. The means of claim 1 wherein said spraying means comprises a hand-held spray gun with a chopper.

4. The means of claim 1 and further including alignment means on said liquid nozzle and said nozzle assembly for automatically aligning said liquid orifice with said elongated air-catalyst orifice when said liquid nozzle and said nozzle assembly are assembled.

5. The means of claim 4 and further including spacer means for properly spacing said liquid nozzle and said nozzle assembly with respect to one another.

6. The means of claim 4 wherein said alignment means further includes a nozzle holder for supporting said liquid nozzle, said nozzle holder and said liquid nozzle including first alignment means for automatically angularly orienting said liquid nozzle with said nozzle holder, and wherein said nozzle assembly and said nozzle holder include second alignment means for automatically angularly orienting said elongated air-catalyst nozzle with respect to said nozzle holder for automatically aligning said liquid orifice with said elongated air-catalyst orifice.

7. An external mix, plural component spraying system comprising:

a first source of first component;

a second source of second component;

a hand-held spray gun for mixing said first and second components and for directing mixed first and second components at a substrate;

liquid delivery means for providing a flow of said first component from said first source to said spray gun;

a source of compressed air;

air delivery means for providing a flow of compressed air from said compressed air source to said spray gun; and mixing means coupled to said second source and to said compressed air source for introducing said second component into said compressed air, said mixing means being coupled to said spray gun for delivering a flow of compressed air and second component to said spray gun, said spray gun including an airless liquid nozzle for forming the first component flow into a fan-like film with edges expanding from a liquid orifice, and a nozzle assembly for directing a flow of compressed air and second component at the fan-like film closely adjacent to the airless liquid nozzle and for further directing a flow of compressed air at the expanding edges of the fan-like film downstream of the impingement of the second component, said flows of compressed air and second component interacting with the fan-like film of the first component and its expanding edges to capture the particles of the second component and to incorporate and to mix and distribute the particles of second component with particles of first component formed from the fan-like film of first component.

8. The system of claim 7 wherein said first component comprises a resinous material and said second component comprises a catalyst for said resinous material.

9. The system of claim 8 wherein the nozzle assembly comprises:

a nozzle body having a central opening at its longitudinal center line in which the airless liquid nozzle is positioned;

a pair of air-catalyst spray nozzles equally spaced on opposing sides of the longitudinal center line of the nozzle body for directing said flow of compressed air and catalyst particles at the planar surfaces of the fan-like resin film; and a pair of air orifices being equally spaced on opposing sides of the longitudinal center line of the nozzle body and located on a line that perpendicularly bisects the line between the pair of air-catalyst spray nozzles, for directing said flow of compressed air at the expanding edges of the fan-like resin film, said air-catalyst spray nozzles being oriented to direct the flow of compressed air and catalyst particles to intersect the longitudinal center line of the nozzle body a fraction of an inch in front of the nozzle body, and said air orifices being positioned to direct a flow of compressed air forwardly of the nozzle body and generally parallel to its longitudinal center line.

10. A method of forming an article from a plurality of mixed components, comprising:

delivering a flow of a first component to a spraying means;

delivering a flow of compressed air to said spraying means;

introducing a second component into a flow of compressed air to said spraying means;

forming the first component flow into a fan-like film with expanding edges extending from the spraying means;

dividing the flow of compressed air and second component into at least two air-second component flows and directing the at least two air-second component flows at the fan-like film of said first component from opposite sides of the film within a fraction of an inch of the spraying means;

dividing the flow of compressed air into at least two air flows directed at the expanding edges of the fan-like film downstream of intersection of the air-second component flows with the fan-like film of first component;

atomizing the first component and mixing the first component and second component with the flows of compressed air; and directing the atomized and mixed first and second components at an article-forming substrate where the first and second mixed components harden to form an article.

11. The method of claim 10 wherein said introducing step comprises introducing catalyst particles into the flow of compressed air externally of said spraying means, and said compressed air delivering step comprises delivering a flow of compressed air having catalyst particles mixed therein to said spraying means.

12. The method of claim 10 wherein said spraying means comprises a hand-held spray gun, and said directing step comprises sweeping said spray gun over said article forming substrate.

13. The method of claim 10 wherein the first component is a resin and the second component is a catalyst for the resin.

14. A nozzle for use with an airless spray nozzle in an external mix, plural component system, comprising:

a body forming an opening in its face permitting the body to be positioned adjacent an airless spray nozzle that is adapted to project a first component material in a plane forwardly of the body, said body having a plurality of means to direct combined flows of compressed air and a second component material forwardly of the body in a direction to intersect the plane of the first component material projected from the airless spray nozzle a fraction of an inch forwardly of the face of the body, and a plurality of means to direct flows of compressed air forwardly of the body, generally parallel to each other and generally in the plane of the first component material projected from the airless spray nozzle, said plurality of means to direct combined flows of compressed air and a second plural component material comprising a pair of air-catalyst spray nozzles centered upon and equally spaced on opposite sides of the body opening and oriented at an acute angle in the face of the body and said plurality of means to direct flows of compressed air forwardly of the body comprising a pair of passageways forming orifices centered upon and equally spaced on opposite sides of the body opening and further being generally equally spaced from each of the pair of air-catalyst spray nozzles, each of said passageways including a portion lying along lines perpendicular to the face of the nozzle body adjacent the face of the nozzle body, and each of said orifices being encompassed by a small cavity formed in the face of the nozzle body.

15. The nozzle of claim 14 wherein the small cavities are cylindrically shaped cavities having their longitudinal central axes lying at an acute angle with respect to the axes of the passageway portions.

16. The nozzle of claim 15 wherein each of the pair of air-catalyst spray nozzles is spaced a fraction of an inch from the nozzle body opening, each of the pair of air passages is spaced a fraction of an inch from the nozzle body opening and the cylindrically shaped cavities having an inside diameter about twice the inside diameter of the pair of passageways.

17. The nozzle of claim 14 wherein the pair of air-catalyst spray nozzles are in a plane that is perpendicular to the plane of projection of the first plural component and bisects the projected first plural component, and the pair of compressed air passageways are in a plane that perpendicularly bisects the plane of the air-catalyst spray nozzles.

18. The nozzle of claim 14 wherein the nozzle is adapted for connection with a spray gun, said spray gun being adapted for connection with a source of compressed air, a source of the first component material, and a source of the second component material, the front portion of the spray gun being adapted to carry said airless spray nozzle and said nozzle, said front portion of the spray gun forming a passageway to direct the first component material to the airless spray nozzle and providing means to seal against high hydraulic pressures, said spray gun providing means to mix flows of second component material and compressed air and to deliver the combined flows of compressed air and second component through said front portion to said nozzle assembly and its said plurality of means to direct combined flows of compressed air and second component material, said front portion also forming a passageway to direct compressed air to said nozzle assembly and its plurality of means to direct flows of compressed air forwardly of the nozzle body.

19. A method of forming an article from a plurality of mixed components, comprising:

delivering a flow of a first component to a spraying means;

introducing a second component into a flow of compressed air and delivering the flow of compressed air and introduced second component to said spraying means;

forming the first component flow into a fan-like film with expanding edges extending from the spraying means;

directing the flow of compressed air and second component at the fan-like film of said first component closely adjacent the spraying means;

directing a pair of flows of compressed air to intersect the flows of first component and of compressed air and second component downstream of their intersection to assist atomization and mixing and to substantially contain the first component and second component; and directing the atomized and mized first and second components at an article-forming substrate in a spray pattern substantially without the escape of said components.

20. The method of claim 19 including the steps of dividing the flow of compressed air and second component into at least two air-second component flows directed at the fan-like film of said first component from opposite sides of the film within a fraction of an inch of the spraying means, and directing the pair of air flows at the expanding edges of the fan-like film downstream of intersection of the air-second component flows with the fan-like film of first component.

21. The method of claim 20 wherein said introducing step comprises introducing catalyst particles into the flow of compressed air externally of said spraying means, and said compressed air-delivering step comprises delivering a flow of compressed air having catalyst particles mixed therein to said spraying means.

22. Means for forming an article from a catalyzed, resinous material, comprising:

a first source of resin;

a second source of catalyst for said resin;

spraying means to mix said catalyst with said resin and to direct mixed catalyst and resin at an article-forming substrate;

liquid delivery means to provide a flow of resin from said first source to said spraying means;

air delivery means to provide a flow of compressed air to said spraying means; and injection means to introduce catalyst in a flow of air from said air delivery means, said spraying means comprising a liquid nozzle for forming the resin flow into a fan-like resin film with expanding edges extending from a liquid orifice, and a nozzle assembly directing compressed air and catalyst particles at the fan-like resin film, said nozzle assembly having a central opening in which a liquid nozzle is positioned, a pair of air-catalyst nozzles for directing compressed air and catalyst particles at the fan-like resin film from opposing sides thereof to impinge upon the fan-like resin film a fraction of an inch forwardly of the liquid orifice, and a pair of air passageways for directing compressed air at the expanding edges of the fan-like resin film to intersect the expanding edges of the fan-like film at a distance farther from the liquid orifice than the directed compressed air and catalyst particles, said liquid nozzle and said nozzle assembly being adapted so that the compressed air and catalyst particles interact with the fan-like resin film and its expanding edges to provide a spray pattern with mixed catalyst and resin particles substantially uniformly distributed throughout the spray pattern.

* * * * *

UNITED STATES PATENT AND TRADEMARK OFFICE
CERTIFICATE OF CORRECTION

PATENT NO. : 4,824,017

DATED : APRIL 25, 1989

INVENTOR(S) : GREGORY ALAN MANSFIELD

It is certified that error appears in the above-identified patent and that said Letters Patent is hereby corrected as shown below:

In "[57] Abstract:", line 13, delete "colsely" and insert -- closely -- therefor.

In col. 4, line 17, delete "are" and insert -- is -- therefor; line 22, delete "systems" and insert -- system -- therefor; line 57, after "flow", insert -- of --.

In col. 6, line 5, delete "of" (second occurrence).

In col. 11, line 10, delete "liquidnozzle" and insert -- liquid nozzle -- therefor; line 44, delete "214" and insert -- 241 --.

In col. 12, lines 33-34, delete "critically" and insert -- criticality -- therefor.

In col. 13, line 45, delete "Cstalyst-injection" and insert -- Catalyst-injection -- therefor.

In col. 14, line 2, after "to", insert -- the --; line 35, delete "As" and insert -- At -- therefor.

In col. 15, line 8, delete "or" and insert -- of -- therefor; line 38, delete "the".

In col. 16, line 33, delete "34" and insert -- 324 -- therefor.

In col. 17, line 9, delete "(" (second occurrence); line 37, delete "maybe" and insert therefor -- may be--; line 59, delete "three-eights" and insert -- three-eighths -- therefor.

UNITED STATES PATENT AND TRADEMARK OFFICE

CERTIFICATE OF CORRECTION

PATENT NO. : 4,824,017

DATED : APRIL 25, 1989

INVENTOR(S) : GREGORY ALAN MANSFIELD

It is certified that error appears in the above-identified patent and that said Letters Patent is hereby corrected as shown below:

In col. 18, line 23, delete "nd" and insert -- and -- therefor.

In col. 19, line 12, delete "one-halt" and insert -- one-half -- therefor; line 20, after "324b", insert -- ) -- (a close parenthesis); line 25, delete "catalyt" and insert -- catalyst -- therefor.

In col. 20, line 35 (claim 1, line 38), delete "to" and insert -- so -- therefor.

Signed and Sealed this

Tenth Day of April, 1990

*Attest:*

HARRY F. MANBECK, JR.

*Attesting Officer*

*Commissioner of Patents and Trademarks*